(12) United States Patent
Sekiguchi et al.

(10) Patent No.: US 8,111,420 B2
(45) Date of Patent: Feb. 7, 2012

(54) PRINTER CONTROL APPARATUS AND METHOD OF CONTROLLING THE SAME, PRINTER AND METHOD OF CONTROLLING THE SAME, READER AND METHOD OF CONTROLLING THE SAME, AND IMAGE FORMING SYSTEM

(75) Inventors: Nobuo Sekiguchi, Ibaraki (JP); Masahiro Serizawa, Ibaraki (JP); Yoshihito Osari, Chiba (JP); Akinobu Nishikata, Chiba (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/563,742

(22) Filed: Sep. 21, 2009

(65) Prior Publication Data

US 2010/0007923 A1    Jan. 14, 2010

Related U.S. Application Data

(60) Continuation of application No. 11/748,449, filed on May 14, 2007, now Pat. No. 7,593,128, which is a division of application No. 10/254,453, filed on Sep. 25, 2002, now Pat. No. 7,233,410.

(30) Foreign Application Priority Data

Sep. 28, 2001  (JP) ................................. 2001-301047

(51) Int. Cl.
*G03G 21/14* (2006.01)
*H04N 1/36* (2006.01)

(52) U.S. Cl. ...... 358/1.16; 358/1.15; 358/404; 358/409; 358/412; 358/435; 358/486; 399/76

(58) Field of Classification Search ......... 358/1.14–1.18
See application file for complete search history.

(56) References Cited

U.S. PATENT DOCUMENTS 4,386,373 A    5/1983    Kondo et al.
(Continued)

FOREIGN PATENT DOCUMENTS

JP    5-130324 A    5/1993
(Continued)

OTHER PUBLICATIONS

Office action issued in corresponding Japanese application No. 2001-301047, dated Apr. 5, 2011.

*Primary Examiner* — Chan Park
(74) *Attorney, Agent, or Firm* — Rossi, Kimms & McDowell LLP

(57) ABSTRACT

A printer control apparatus can be applied to an image forming apparatus in which a plurality of types of readers and a plurality of types of printers can be connected to a single controller, and which enables efficient transfer of image data from the reader to the printer via an image memory of the controller. The controller receives image data from a reader and temporarily stores the same in an image memory, and transmits the stored image data to a printer. The controller acquires a reader processing speed from the reader and a printer processing speed from the printer, and determines, while the image data is being written to the image memory, timing for transmitting the image data written in the memory to the printer according to a difference between the reader processing speed and the printer processing speed and a sub-scan size of the image data.

5 Claims, 17 Drawing Sheets

U.S. PATENT DOCUMENTS

| | | |
|---|---|---|
| 4,661,857 A | 4/1987 | Kondo |
| 4,679,096 A | 7/1987 | Nagashima |
| 5,123,063 A * | 6/1992 | Ohkubo ........................ 382/318 |
| 5,687,302 A | 11/1997 | Kawase |
| 5,726,762 A * | 3/1998 | Akada et al. ................... 358/401 |
| 5,781,310 A | 7/1998 | Nakamura et al. |
| 5,907,319 A * | 5/1999 | Hashimoto et al. ........... 345/173 |
| 6,542,253 B1 | 4/2003 | Kim |

FOREIGN PATENT DOCUMENTS

| | | |
|---|---|---|
| JP | 8-97991 A | 4/1996 |
| JP | 9-294185 A | 11/1997 |
| JP | 11-298704 A | 10/1999 |

* cited by examiner

FIG. 4A

[READER PROCESSING SPEED TABLE]

| READER ID | 1 | 2 | 3 | 4 |
|---|---|---|---|---|
| READER PROCESSING SPEED=R | 100 | 150 | 250 | 300 |

FIG. 4B

[PRINTER PROCESSING SPEED TABLE]

| PRINTER ID | 1 | 2 | 3 | 4 |
|---|---|---|---|---|
| PRINTER PROCESSING SPEED=P | 300 | 350 | 400 | 450 |

FIG. 4C

PRINTER CLOCK SYNCHRONOUS IMAGE DATA READOUT STARTING POSITION
= IMAGE SUB-SCAN SIZE * (P−R)/P

PRINTER CLOCK SYNCHRONOUS IMAGE DATA READOUT TIMING
= IMAGE SUB-SCAN SIZE * (300−150)/300
= IMAGE SUB-SCAN SIZE * 0.5
WHEREIN READER ID=2 AND PRINTER=1

IMAGE ON IMAGE MEMORY (COMPLETION OF 1/2 IMAGE OUTPUT)
(END OF 3/4 IMAGE INPUT)

(END OF IMAGE INPUT AND END OF IMAGE OUTPUT)

FIG. 12A

[READER PROCESSING SPEED TABLE]

| NUMBER OF COPIES READ BY READER PER MINUTE | 20 | 30 | 40 | 60 |
|---|---|---|---|---|
| READER PROCESSING SPEED=R | 100 | 150 | 250 | 300 |

FIG. 12B

[PRINTER PROCESSING SPEED TABLE]

| NUMBER OF COPIES PRINTED BY PRINTER PER MINUTE | 30 | 40 | 60 | 80 |
|---|---|---|---|---|
| PRINTER PROCESSING SPEED=P | 300 | 350 | 400 | 450 |

FIG. 12C

PRINTER CLOCK SYNCHRONOUS IMAGE DATA READOUT STARTING POSITION
= IMAGE SUB-SCAN SIZE * (P-R)/P

PRINTER CLOCK SYNCHRONOUS IMAGE DATA READOUT TIMING
= IMAGE SUB-SCAN SIZE * (300-150)/300
= IMAGE SUB-SCAN SIZE * 0.5

WHEREIN NUMBER OF COPIES READ BY READER=30 AND
NUMBER OF COPIES PRINTED BY PRINTER=30

FIG. 15A

[TIMING TABLE BASED ON IDS]

| READER ID | 1 | 2 | 3 | 4 | 1 | 2 | 3 | 4 | 1 | 2 | 3 | 4 | 1 | 2 | 3 | 4 |
|---|---|---|---|---|---|---|---|---|---|---|---|---|---|---|---|---|
| PRINTER ID | 1 | 1 | 1 | 1 | 2 | 2 | 2 | 2 | 3 | 3 | 3 | 3 | 4 | 4 | 4 | 4 |
| TIMING GENERATION RATIO=TGR | 0.66 | 0.5 | 0.17 | 0 | 0.71 | 0.57 | 0.28 | 0.14 | 0.75 | 0.63 | 0.25 | 0.25 | 0.78 | 0.67 | 0.44 | 0.33 |

FIG. 15B

PRINTER CLOCK SYNCHRONOUS IMAGE DATA READOUT STARTING POSITION
 =IMAGE SUB-SCAN SIZE *TGR

PRINTER CLOCK SYNCHRONOUS IMAGE DATA READOUT TIMING
 =IMAGE SUB-SCAN SIZE *0.5
WHEREIN READER ID=2 AND PRINTER ID=1

PRINTER CLOCK SYNCHRONOUS IMAGE DATA READOUT TIMING
 =IMAGE SUB-SCAN SIZE *0
 =0 ← INPUT FROM READER AND OUTPUT FROM PRINTER ARE STARTED AT THE SAME TIME
WHEREIN READER ID=4 AND PRINTER ID=1

FIG. 17A

[TIMING TABLE BASED ON NUMBERS OF COPIES]

| NUMBER OF COPIES READ BY READER PER MINUTE | 20 | 30 | 40 | 60 | 20 | 30 | 40 | 60 | 20 | 30 | 40 | 60 | 20 | 30 | 40 | 60 |
|---|---|---|---|---|---|---|---|---|---|---|---|---|---|---|---|---|
| NUMBER OF COPIES PRINTED BY PRINTER PER MINUTE | 30 | 30 | 30 | 30 | 40 | 40 | 40 | 40 | 60 | 60 | 60 | 60 | 80 | 80 | 80 | 80 |
| TIMING GENERATION RATIO=TGR | 0.66 | 0.5 | 0.17 | 0 | 0.71 | 0.57 | 0.28 | 0.14 | 0.75 | 0.63 | 0.25 | 0.25 | 0.78 | 0.67 | 0.44 | 0.33 |

FIG. 17B

PRINTER CLOCK SYNCHRONOUS IMAGE DATA READOUT STARTING POSITION
=IMAGE SUB-SCAN SIZE * TGR

PRINTER CLOCK SYNCHRONOUS IMAGE DATA READOUT TIMING
=IMAGE SUB-SCAN SIZE * 0.5
WHEREIN NUMBER OF COPIES READ BY READER=30 AND
NUMBER OF COPIES PRINTED BY PRINTER=30

PRINTER CLOCK SYNCHRONOUS IMAGE DATA READOUT TIMING
=IMAGE SUB-SCAN SIZE * 0
=0 ← INPUT FROM READER AND OUTPUT FROM PRINTER ARE STARTED AT THE SAME TIME
WHEREIN NUMBER OF COPIES READ BY READER=60 AND
NUMBER OF COPIES PRINTED BY PRINTER=30

PRINTER CONTROL APPARATUS AND METHOD OF CONTROLLING THE SAME, PRINTER AND METHOD OF CONTROLLING THE SAME, READER AND METHOD OF CONTROLLING THE SAME, AND IMAGE FORMING SYSTEM

CROSS REFERENCE TO RELATED APPLICATION

This is a continuation application of and claims priority from U.S. patent application Ser. No. 11/748,449, filed May 14, 2007, which is a divisional application of U.S. patent application Ser. No. 10/254,453 filed Sep. 25, 2002, now U.S. Pat. No. 7,233,410 which claims priority from Japanese Patent Application 2001-301047 filed Sep. 28, 2001 the content of each of which are incorporated herein by reference.

BACKGROUND OF THE INVENTION

1. Field of the Invention

The present invention relates to a printer control apparatus having a controller for use in exchanging data between a reader and a printer thereof, and a method of controlling the same, a printer and a method of controlling the same, a reader and a method of controlling the same, and an image forming system.

2. Description of the Related Art

Conventionally, an image forming apparatus has been proposed, which is comprised of a reader section that reads an image, a printer that prints image data, and an image controller that performs image processing, stores images, and controls image data. The reader, the printer, and the image controller are configured as an integral unit.

Many of image forming apparatuses of this kind are digital copying machines that are comprised of a reader and a printer which perform processing at the same processing speed. In the case where the processing speeds of the reader and the printer are equal, the timing for starting scanning an original by the reader and the timing for starting printing by the printer are uniquely defined such that the printer starts printing data on the sheet and the reader starts scanning the original at the same time, when a sheet is fed to a print-enabling position.

In recent years, however, digital copying machines have been developed which are additionally provided with multiple functions such as a facsimile function and a PDL printing function. Some of such digital copying machines have a page memory that temporarily stores image data on a page-by-page basis, and some of such digital copying machines are called image servers and are capable of storing image data compressed in advance. Further, multifunction digital copying machines with increased productivity have been developed, and they have realized a considerable increase in the processing speed at which a reader scans an original and the processing speed at which a printer carries out printing operation.

Under the circumstances, digital copying machines have been proposed which enable efficient printing by absorbing a speed difference in the case where there is a difference in processing speed between a reader and a printer thereof.

Specifically, the data transfer speed of photoelectric conversion means such as a CCD which converts an optical image into electric image data after scanning of an original by the reader is usually higher than the data transfer speed of exposure means such as a laser which forms an image as an electrophotograph by the printer. Since thus there is a difference in the processing speed between the reader and the printer, the digital copying machines are configured to temporarily store image data from the reader in the above-mentioned page memory and then transmit the image data from the page memory to the printer in timing calculated according to a predetermined equation to absorb the difference in the processing speed.

With this arrangement, image data can be efficiently printed in such timing that transmission of image data to the printer never outpaces writing of an image by the reader.

With the trend of multi-functioning, however, digital copying machines have been developed which are comprised of a reader that reads an original and converts the read image into image data, a printer that receives the image data and prints the same on a sheet or the like, and a controller that executes an image data processing function, image data storage function, PDL function, network function, and others. These component parts are configured in separate bodies, and the controller controls respective engines of the reader and the printer via an interface common to them. With this arrangement, a plurality of readers that perform processing at different processing speeds and a plurality of printers that perform processing at different processing speeds can be connected to one controller.

In order to efficiently transfer image data from the reader to the printer via the page memory of the controller in the above described image forming apparatus, there is the necessity of acquiring respective processing speeds of a plurality of readers and a plurality of printers and calculating the timing for transmitting image data to the printers according to configurations of the readers and the printers. This requirement, however, cannot be satisfied according to the prior art.

SUMMARY OF THE INVENTION

It is therefore an object of the present invention to provide a printer control apparatus and a method of controlling the same, a printer and a method of controlling the same, a reader and a method of controlling the same, and an image forming system, which can be applied to an image forming apparatus in which a plurality of types of readers and a plurality of types of printers can be connected to a single controller, and which enable efficient transfer of image data from the reader to the printer via an image memory of the controller.

To attain the above object, in a first aspect of the present invention, there is provided a printer control apparatus that receives image data from a reader, stores the image data in a memory, and transmits the stored image data from the memory to a printer, comprising first acquiring means for acquiring reader information related to the reader from the reader, second acquiring means for acquiring printer information related to the printer from the printer, and a controller that, while image data received from the reader is being written to the memory, determines timing for transmitting the image data written in the memory to the printer according to the reader information acquired by the first acquiring means and the printer information acquired by the second acquiring means.

Preferably, in the printer control apparatus according to the first aspect, the controller determines the timing according to the reader information acquired by the first acquiring means, the printer information acquired by the second acquiring means, and a sub-scan size of the image data.

To attain the above object, in a second aspect of the present invention, there is provided a printer control apparatus that receives image data from a reader, stores the image data in a memory, and transmits the stored image data from the memory to a printer, comprising first acquiring means for acquiring a reader processing speed, at which the reader reads image data in a sub-scanning direction, from the reader, second acquiring means for acquiring a printer processing speed, at which the printer prints image data in the sub-scanning direction, from the printer, and a controller that, while image data of a predetermined size received from the reader is being written to the memory, determines timing for transmitting the image data written in the memory to the printer according to the reader processing speed acquired by the first acquiring means, the printer processing speed acquired by the second acquiring means, and a sub-scan size of the image data.

Preferably, in the printer control apparatus according to the second aspect, the controller determines the timing according to a difference between the reader processing speed acquired by the first acquiring means and the printer processing speed acquired by the second acquiring means, and the sub-scan size of the image data.

To attain the above object, in a third aspect of the present invention, there is provided a printer control apparatus that receives image data from a reader, stores the image data in a memory, and transmits the stored image data from the memory to a printer, comprising first acquiring means for acquiring a reader ID representing a type of the reader from the reader, second acquiring means for acquiring a printer ID representing a type of the printer from the printer, a reader processing speed table showing a relationship between a reader processing speed, at which the reader reads image data in a sub-scanning direction, and the reader ID, a printer processing speed table showing a relationship between a printer processing speed, at which the printer prints image data in the sub-scanning direction, and the printer ID, and a controller that, while image data of a predetermined size received from the reader is being written to the memory, determines timing for transmitting the image data written in the memory to the printer according to the reader processing speed acquired by referring to the reader processing speed table with the reader ID, the printer processing speed acquired by referring to the printer processing speed table with the printer ID, and a sub-scanning size of the image data.

Preferably, in the printer control apparatus according to the third aspect, the controller determines the timing according to a difference between the reader processing speed acquired from the reader processing speed table and the printer processing speed acquired from the printer processing speed table, and the sub-scan size of the image data.

To attain the above object, in a fourth aspect of the present invention, there is provided a printer control apparatus that receives image data from a reader, stores the image data in a memory, and transmits the stored image data from the memory to a printer, comprising first acquiring means for acquiring a number of copies read by the reader per unit time from the reader, second acquiring means for acquiring a number of copies printed by the printer per unit time from the printer, a reader processing speed table showing a relationship between a reader processing speed, at which the reader reads image data in a sub-scanning direction, and the number of copies read by the reader per unit time, a printer processing speed table showing a relationship between a printer processing speed, at which the printer prints image data in the sub-scanning direction, and the number of copies printed by the printer per unit time, and a controller that, while image data of a predetermined size received from the reader is being written to the memory, determines timing for transmitting the image data written in the memory to the printer according to the reader processing speed acquired by referring to the reader processing speed table with the number of copies read by the reader per unit time, the printer processing speed acquired by referring to the printer processing speed table with the number of copies read by the printer per unit time, and a sub-scanning size of the image data.

Preferably, in the printer control apparatus according to the fourth aspect, the controller determines the timing according to a difference between the reader processing speed and the printer processing speed, and the sub-scan size of the image data.

To attain the above object, in a fifth aspect of the present invention, there is provided a printer control apparatus that receives image data from a reader, stores the image data in a memory, and transmits the stored image data from the memory to a printer, comprising first acquiring means for acquiring a reader ID representing a type of the printer from the reader, second acquiring means for acquiring a printer ID representing a type of the printer from the printer, a timing table showing an image data readout timing generation ratio corresponding to the reader ID and the printer ID, and a controller that, while image data of a predetermined size received from the reader is being written to the memory, determines timing for transmitting the image data written in the memory to the printer according to the image data readout timing generation ratio acquired by referring to the timing table with the reader ID and the printer ID, and a sub-scan size of the image data.

To attain the above object, in a sixth aspect of the present invention, there is provided a printer control apparatus that receives image data from a reader, stores the image data in a memory, and transmits the stored image data from the memory to a printer, comprising first acquiring means for acquiring a number of copies read by the reader per unit time from the reader, second acquiring means for acquiring a number of copies printed by the printer per unit time from the printer, a timing table showing an image data readout timing generation ratio corresponding to the number of copies read by the reader per unit time and the number of copies printed by the printer per unit time, and a controller that, while image data of a predetermined size received from the reader is being written to the memory, determines timing for transmitting the image data written in the memory to the printer according to the image data readout timing generation ratio acquired by referring to the timing table with the number of copies read by the reader per unit time and the number of copies printed by the printer per unit time, and a sub-scanning size of the image data.

To attain the above object, in a seventh aspect of the present invention, there is provided a printer that receives image data from a reader that reads an original, and prints the image data on a sheet, comprising a memory that stores the image data received from the reader, receiving means for receiving reader information related to the reader from the reader, and a controller that, while image data received from the reader is being written to the memory, determines timing for reading out the image data written in the memory according to the reader information received by the receiving means and printer information related to the printer.

Preferably, in the printer according to the seventh aspect, the controller determines the timing according to the reader information received by the receiving means, the printer information, and a sub-scan size of the image data.

To attain the above object, in an eighth aspect of the present invention, there is provided a reader that reads image data on an original and transmits the read image data to a printer, comprising a memory that stores the read image data, receiving means for receiving printer information related to the printer from the printer, and a controller that, while the read image data is being written to the memory, determines timing for reading out the image data written in the memory according to the printer information received by the receiving means and reader information related to the reader.

Preferably, in the reader according to the eighth aspect, the controller determines the timing according to the printer information received by the receiving means, the reader information, and a sub-scan size of the image data.

To attain the above object, in a ninth aspect of the present invention, there is provided a method of controlling a printer control apparatus that receives image data from a reader that reads an original, stores the image data in a memory, and transmits the stored image data from the memory to a printer, the method comprising the steps of receiving reader information related to the reader from the reader and printer information related to the printer from the printer, determining, while image data received from the reader is being written to the memory, timing for transmitting the image data written in the memory to the printer according to the reader information received from the reader and the printer information received from the printer, causing the reader to start reading the original, and transmitting the written image data from the memory to the printer in the determined timing.

To attain the above object, in a tenth aspect of the present invention, there is provided a method of controlling a printer control apparatus that receives image data from a reader that reads an original, stores the image data in a memory, and transmits the stored image data from the memory to a printer, the method comprising the steps of receiving a reader processing speed, at which the reader reads image data in a sub-scanning direction, from the reader, and a printer processing speed, at which the printer prints image data in the sub-scanning direction, from the printer, determining, while image data of a predetermined size received from the reader is being written to the memory, timing for transmitting the image data written in the memory to the printer according to the reader processing speed received from the reader and the printer processing speed received from the printer, causing the reader to start reading the original, and transmitting the written image data from the memory to the printer in the determined timing.

To attain the above object, in an eleventh aspect of the present invention, there is provided a method of controlling a printer control apparatus that receives image data from a reader that reads an original, stores the image data in a memory, and transmits the stored image data from the memory to the printer, the method comprising the steps of receiving a reader ID representing a type of the reader from the reader and a printer ID representing a type of the printer from the printer, determining a reader processing speed, at which the reader reads image data in a sub-scanning direction, according to the reader ID received from the reader, and determining a printer processing speed, at which the printer prints image data in the sub-scanning direction according to the printer ID received from the printer, determining, while image data of a predetermined size received from the reader is being written to the memory, timing for transmitting the image data written in the memory to the printer according to the reader processing speed corresponding to the reader ID, the printer processing speed corresponding to the printer ID, and a sub-scanning size of the image data, causing the reader to start reading the original, and transmitting the written image data from the memory to the printer in the determined timing.

To attain the above object, in a twelfth aspect of the present invention, there is provided a method of controlling a printer control apparatus that receives image data from a reader that reads an original, stores the image data in a memory, and transmits the stored image data from the memory to a printer, the method comprising the steps of receiving a number of copies read by the reader per unit time from the reader and a number of copies printed by the printer per unit time from the printer, determining a reader processing speed, at which the reader reads image data in a sub-scanning direction, according to the number of copies read by the reader per unit time, and determining a printer processing speed, at which the printer prints image data in the sub-scanning direction according to the number of copies printed by the printer per unit time, determining, while image data of a predetermined size received from the reader is being written to the memory, timing for transmitting the image data written in the memory to the printer according to the reader processing speed corresponding to the number of copies read by the reader per unit time, the printer processing speed corresponding to the number of copies printed by the printer per unit time, and a sub-scanning size of the image data, causing the reader to start reading the original, and transmitting the written image data from the memory to the printer in the determined timing.

To attain the above object, in a thirteenth aspect of the present invention, there is provided a method of controlling a printer control apparatus that receives image data from a reader that reads an original, stores the image data in a memory, and transmits the stored image data from the memory to a printer, the method comprising the steps of receiving a reader ID representing a type of the printer from the reader and a printer ID representing a type of the printer from the printer, determining an image data readout timing generation ratio corresponding to the reader ID received from the reader and the printer ID received from the printer, determining, while image data of a predetermined size received from the reader is being written to the memory, timing for transmitting the image data written in the memory to the printer according to the image data readout timing generation ratio corresponding to the reader ID and the printer ID, and a sub-scanning size of the image data, causing the reader to start reading the original, and transmitting the written image data from the memory to the printer in the determined timing.

To attain the above object, in a fourteenth aspect of the present invention, there is provided a method of controlling a printer control apparatus that receives image data from a reader that reads an original, stores the image data in a memory, and transmits the stored image data from the memory to a printer, the method comprising the steps of receiving a number of copies read by the reader per unit time from the reader and a number of copies printed by the printer per unit time from the printer, determining an image data readout timing generation ratio corresponding to the number of copies read by the reader per unit time, received from the reader, and the number of copies printed by the printer per unit time, received from the printer, determining, while image data of a predetermined size received from the reader is being written to the memory, timing for transmitting the image data written in the memory to the printer according to the image data readout timing generation ratio corresponding to the number of copies read by the reader per unit time and the number of copies printed by the printer per unit time, and a sub-scanning size of the image data, causing the reader to start reading the original, and transmitting the written image data from the memory to the printer in the determined timing.

To attain the above object, in a fifteenth aspect of the present invention, there is provided a method of controlling a printer that receives image data from a reader that reads an original, stores the received image data in a memory, and prints the image data on a sheet, the method comprising the steps of receiving reader information related to the reader from the reader, receiving printer information related to the printer from the printer, determining, while image data of a predetermined size received from the reader is being written to the memory, timing for transmitting the image data written in the memory to the printer according to the reader information received from the reader and the printer information received from the printer, causing the reader to start reading the original, and transmitting the written image data from the memory to the printer in the determined timing.

To attain the above object, in a sixteenth aspect of the present invention, there is provided a method of controlling a reader that reads and stores image data in a memory, and transmits the stored image data to a printer, the method comprising the steps of receiving a reader information related to the reader from the reader, receiving printer information related to the printer from the printer, determining, while image data received from the reader is being written to the memory, timing for transmitting the image data written in the memory to the printer according to the reader information received from the reader and the printer information received from the printer, causing the reader to start reading the original, and transmitting the written image data from the memory to the printer in the determined timing.

To attain the above object, in a seventeenth aspect of the present invention, there is provided an image forming system comprising a reader that reads an original as image data, a printer that forms image data as an image on a sheet, a controller that receives the image data from the reader, stores the received image data in a memory, and transmits the stored image data from the memory to the printer first notifying means for supplying the controller with reader information related to the reader, and second notifying means for supplying the controller with printer information related to the printer, the controller determines, while image data received from the reader is being written to the memory, timing for transmitting the image data written in the memory to the printer according to the reader information supplied by the first notifying means and the printer information supplied by the second notifying means.

The above and other objects, features, and advantages of the invention will become more apparent from the following detailed description taken in conjunction with the accompanying drawings.

BRIEF DESCRIPTION OF THE DRAWINGS

FIG. 4A is a view showing a reader processing speed table;
FIG. 4B is a view showing a printer processing speed table;
FIG. 4C shows equations.

FIG. 12A is a view showing a reader processing speed table used in a second embodiment of the present invention;
FIG. 12B is a view showing a printer processing speed table used in the second embodiment;
FIG. 12C shows equations used in the second embodiment;
FIG. 15A is a view showing a timing table used in a fourth embodiment of the present invention;
FIG. 15B shows equations used in the fourth embodiment;
FIG. 17A is a view showing a timing table used in a fifth embodiment of the present invention;
FIG. 17B shows equations used in the fifth embodiment.

DETAILED DESCRIPTION OF THE PREFERRED EMBODIMENTS

The present invention will now be described below with reference to the accompanying drawings showing preferred embodiments thereof.

First Embodiment

Figure 1:
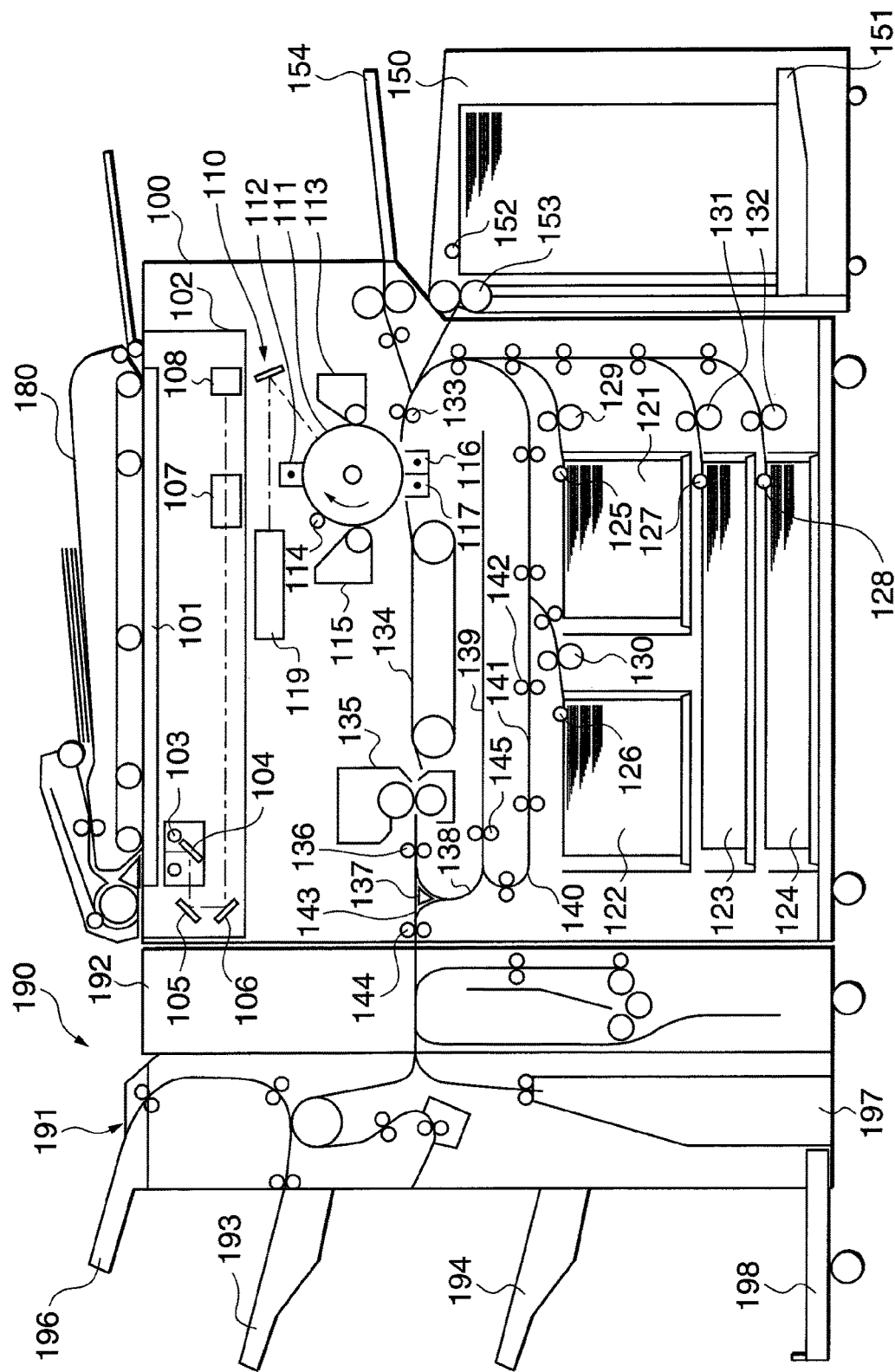
FIG. 1 is a sectional view showing the construction of an image forming apparatus to which is applied a printer control apparatus according to a first embodiment of the present invention.

FIG. 1 is a sectional view showing the construction of an image forming apparatus to which is applied a printer control apparatus according to a first embodiment of the present invention.

The image forming apparatus is comprised of a reader 102, a printer 100, an original feeder or document feeder (DF) 180, and a post-processing device 190. The post-processing device 190 is comprised of a sheet discharging device 191, a Z-folding machine 192, and a binding machine 197. It should be noted that the image forming apparatus may be a system that is comprised of a reader and a printer, which are configured in separate bodies and are connected to each other via a cable.

Reference numeral 101 denotes a platen glass that is comprised of an original radiation lamp 103, a scanning mirror 104, and the like. A motor, not shown, causes a scanner, not shown, to scan an original while moving back and forth in a predetermined direction. Light reflected on the original is transmitted through a lens 107 via scanning mirrors 104 to 106, and is formed on a CCD sensor in an image sensor section 108. The image sensor section 108 converts the reflected light into an electric signal.

Reference numeral 119 denotes a laser section, which irradiates laser light, which has been modulated based on an image signal obtained by performing predetermined image processing on the electric signal converted by the image sensor section 108, as described later, upon a photosensitive drum 111.

A primary electrifier 112, a developer 113, a transfer electrifier 116, a pre-exposure lamp 114, and a cleaning device 115 are disposed around the photosensitive drum 111.

In an image forming section 110, a motor, not shown, causes the photosensitive drum 111 to rotate in a direction indicated by an arrow in FIG. 1. After the photosensitive drum 111 is electrified by the primary electrifier 112 to a desired potential, the laser light from the laser section 119 is irradiated on the photosensitive drum 111 to form an electrostatic latent image thereon. The electrostatic latent image formed on the photosensitive drum 111 is developed by the developer 113 so that it can be made visible as a toner image.

On the other hand, a transfer sheet fed from a right cassette deck 121, a left cassette deck 122, an upper cassette deck 123 or a lower cassette deck 124 by the corresponding pickup roller 125, 126, 127, or 128 is conveyed to the main body of a printer 100 by the corresponding sheet feeding roller 129, 130, 131, or 132. The transfer sheet is then fed to a transfer belt 134 by a resist roller 133, and the toner image made visible is transferred on the transfer sheet by the transfer electrifier 116.

After the transfer, the cleaning device 115 removes residual toner from the photosensitive drum 111, and the pre-exposure lamp 114 erases residual electric charge. The transfer sheet on which has been transferred the toner image is separated from the photosensitive drum 111 by a separation electrifier 117, and is conveyed to a fixing device 135 by the transfer belt 134. The fixing device 135 fixes the toner image on the transfer sheet by pressurizing and heating, and the transfer sheet is then discharged from the printer 100 by a discharge roller 136.

The printer 100 is equipped with a deck 150 that is capable of storing four thousand transfer sheets, for example. A lifter 151 of the deck 150 moves up according to the volume of transfer sheets so that the transfer sheet can be constantly in contact with a pickup roller 152. Each transfer sheet is conveyed to the main body of the printer 100 by a sheet feed roller 153. The printer 100 is also equipped with a multiple manual feed tray 154 that is capable of storing one hundred transfer sheets.

Further, in FIG. 1, reference numeral 137 denotes a sheet discharge flapper that switches the path between a transfer path 138 and a discharge path 143. Reference numeral 140 denotes a lower transfer path that turns upside down the transfer sheet conveyed from the discharge roller 136 via an inversion path 139 to a sheet refeed path 141. A transfer sheet fed from the left cassette deck 122 by the sheet feed roller 130 is also conveyed to the sheet refeed path 141. Reference numeral 142 denotes a sheet refeed roller that refeeds the transfer sheet to the image forming section 110.

Reference numeral 144 denotes a discharge roller that is disposed in the vicinity of the sheet discharge flapper 137 and discharges a transfer sheet, whose path has been switched to the discharge path 143 by the sheet discharge flapper 137, from the apparatus (the printer 100).

To carry out double-sided recording (double-sided printing), the sheet discharge flapper 137 is moved upward, so that a transfer sheet, on which has been printed an image, is conveyed to the sheet refeed path 141 via the transfer path 138, the inversion path 139, and the lower transfer path 140. On this occasion, an inversion roller 145 draws the transfer sheet into the inversion path 139 up to a such a position that the rear end of the transfer sheet completely moves out of the transfer path 138 and is caught by the inversion roller 145. The inversion roller 145 is then reversed to feed the transfer sheet to the transfer path 140.

To invert and discharge a transfer sheet from the main body of the printer 100, the sheet discharge flapper 137 is moved up to draw the transfer sheet into the inversion path 139, and the inversion roller 145 draws the transfer sheet into the inversion path 139 up to a such a position that the rear end of the transfer sheet remains on the transfer path 138. The inversion roller 145 is then reversed to feed the transfer sheet turned upside down toward the discharge roller 144.

The sheet discharging device 191 aligns and binds transfer sheets discharged from the printer 100. The sheet discharging device 191 stacks transfer sheets discharged on a sheet-by-sheet basis on a processing tray 193, and aligns the transfer sheets. If part of transfer sheets on which images have been formed has been discharged, the sheet discharging device 191 staples the transfer sheets in a bundle and discharges the bundle of the transfer sheets onto the processing tray 193 or a sheet discharge tray 194. The sheet discharging tray 194 is controlled to move up and down by a motor, not shown, so that it can be moved to a discharging position before the start of image formation.

Reference numeral 196 denotes a sheet tray on which are stacked interleaved sheets to be inserted between transfer sheets discharged onto the processing tray 193. The Z-folding machine 192 folds the discharged transfer sheets in Z-form. The binding machine 197 performs booking by folding one set of discharged transfer sheets in the middle and then stapling them. A bundle of the stapled transfer sheets is discharged onto a discharge tray 198.

Figure 2:
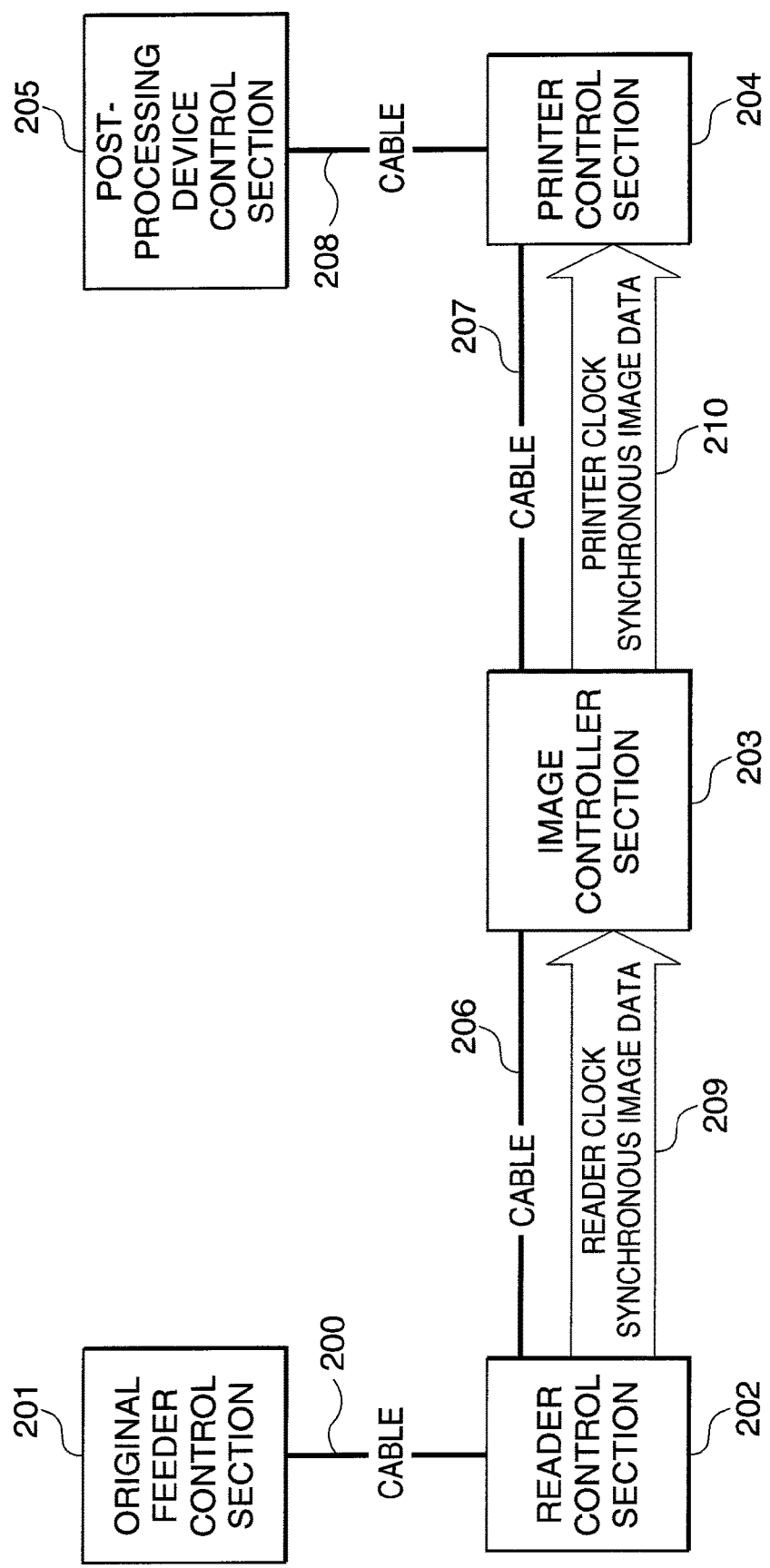
FIG. 2 is a schematic block diagram showing the arrangement of various controllers of the image forming apparatus of FIG. 1.

FIG. 2 is a schematic block diagram showing the arrangement of respective control sections for the original feeder, reader, image controller section, printer, and post-processing device in the image forming apparatus of FIG. 1.

Reference numeral 201 denotes an original feeder control section that controls the original feeder 180 in FIG. 1. Reference numeral 202 denotes a reader control section that controls component parts such as the original radiation lamp 103, scanning mirror 104, and image sensor section 108 of the reader 102 in FIG. 1. The original feeder control section 201 and the reader control section 202 exchange data via a cable 200 so that information on feeding and replacement of originals can be transmitted from the reader 102 and information on completion of placement of an original and the size of an original can be transmitted from the original feeder 180.

Reference numeral 203 denotes an image controller section that captures image data photoelectrically converted by the image sensor section 108 of the reader 102 into the image controller section 203 via a reader image data bus 209 in synchronism with a clock that drives the CCD sensor, performs predetermined image processing on the captured image data, makes settings as to storage of the image data, and controls the entire image data.

The reader control section 202 and the image controller section 203 exchange control data via a cable 206 so that the reader control section 202 can notify the image control section 203 of a reader ID representing the type of the reader and the size of an original to be fed by the original feeder 180, which has been detected by the original feeder control section 201. The image controller section 203 in turn gives the reader 102 an instruction or command for scanning an original and an instruction or command for stopping feeding an original.

Reference numeral 204 denotes a printer control section that controls the printer 100 to provide control related to image formation, such as control of the image forming section 110, control of the laser section 119 for exposing image data, and control for feeding sheets from the respective sheet feeding cassettes 121, 122, 123, 124, 150, 154, and others and conveying the sheets to the post-processing device 190.

The image controller section 203 and the printer control section 204 exchange control data via a cable 207 so that the printer control section 204 can notify the image controller section 203 information on of a printer ID representing the type of the printer and give the section 203 information on completion of feeding, completion of image formation, discharging, and the like.

The image controller section 203 also gives the printer control section 204 a sequence of instructions, such as a sheet feeding instruction for printing image data and an instruction for causing the image forming section 110 to start image formation, so as to form image data as an image on a sheet based on image data, and carries an instruction for causing the post-processing device 190 to carry out post-processing of sheets on which images have been formed by the post-processing device 190.

On this occasion, the image controller section 203 transfers the image data from the image memory therein to the printer control section 204 via a printer clock synchronous image data bus 210 in synchronism with a clock that drives the laser section 119 of the printer 100.

Reference numeral 205 denotes a post-processing device control section that receives an instruction given to the post-processing device 190 according to the post-processing instruction received from the image controller section 203, the timing for forming an image onto a sheet by the printer control section 204, and an instruction given to the post-processing device 190 according to the conveyance of a sheet described with reference to FIG. 1 from the printer control section 204 to control the sheet discharging device 191, Z-folding machine 192, binding machine 197, and the like.

The post-processing device control section 205 and the printer control section 204 exchange control data via a cable 208 so that the post-processing device control section 205 gives the printer control section 204 information on the configuration of the post-processing device 190 such as the sheet discharging device 191, Z-folding machine 192, and the binding machine 197, and information on the condition of the post-processing device 190, e.g. whether the post-processing has been completed or not. On the other hand, the printer control section 204 gives the post-processing device control section 205 an instruction for providing control related to discharge of a sheet on which an image has been formed according to the post-processing instruction received from the image controller section 203 as mentioned above.

Figure 3:
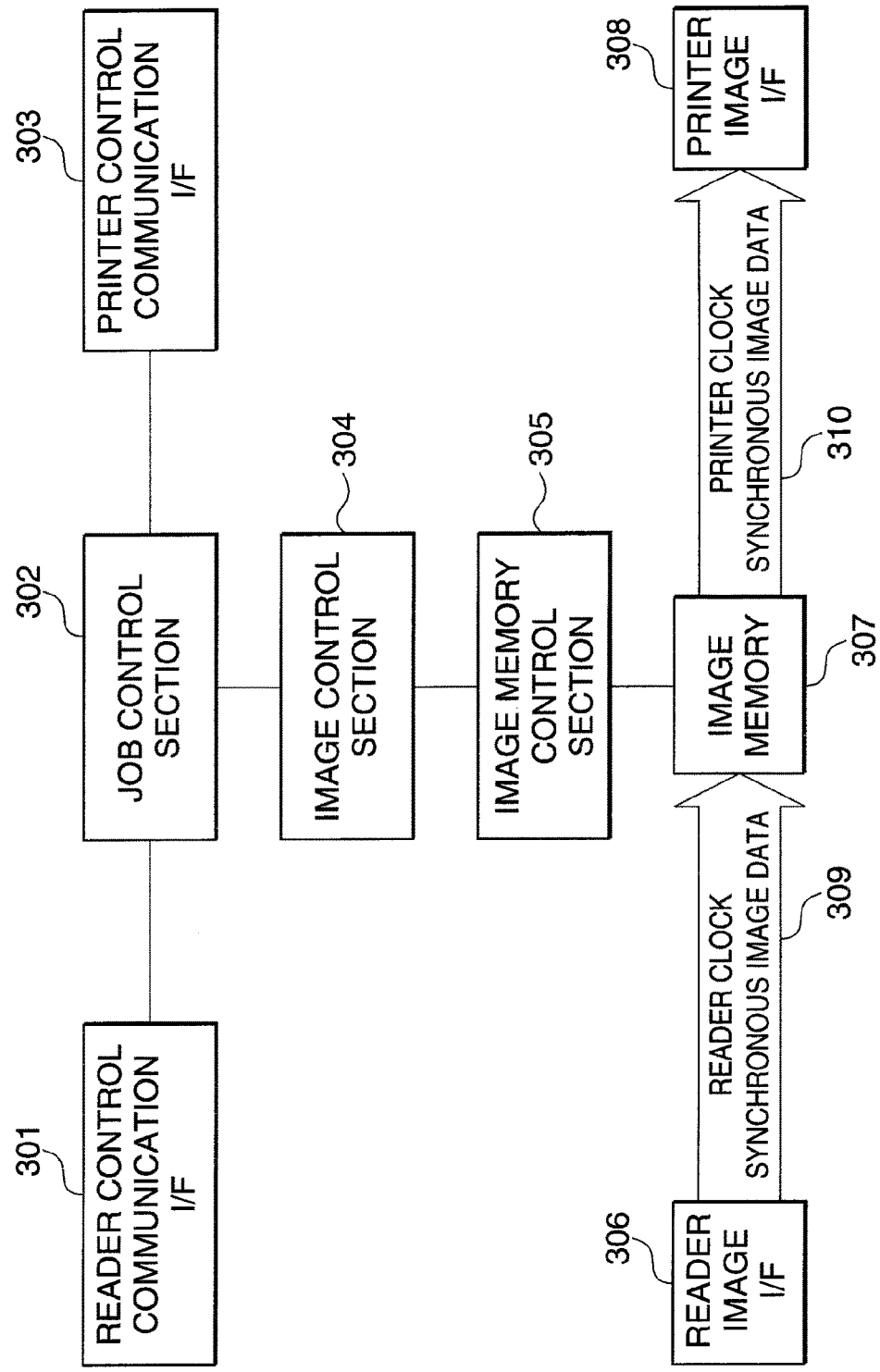
FIG. 3 is a block diagram showing the construction of an image controller section 203 in FIG. 2.

FIG. 3 is a block diagram showing the construction of the image controller section 203 in FIG. 2. In FIG. 3, reference numeral 302 denotes a job control section of the image controller section 203. The job control section 302 analyzes copy mode settings inputted via an operating section, not shown, and controls execution of jobs such as a copy job in response to an instruction for executing a job such as an instruction for starting a copy job inputted via the operating section. In the case where the image controller 203 is provided with a PDL (Page Description Language) system, the job control section 302 is capable of controlling execution of a PDL job.

Reference numeral 301 denotes a reader control communication I/F as a sending and receiving section in the cable or communication line 206 between the image controller section 203 and the reader control section 202. The reader control communication I/F 301 enables the job control section 302 to transmit control data for controlling the reader 102 and the original feeder 180 and acquire original size information and information as to whether there is any original or not from the reader control section 202.

Reference numeral 303 denotes a printer control communication I/F as a sending and receiving section in the cable or communication line 207 between the image controller section 203 and the printer control section 204. This enables the job control section 302 to send control data for controlling the printer 100 and the after-treatment device 190 and acquire information on a sheet conveyance condition, printing condition, after-treatment condition, and so forth from the printer control section 204.

Reference numeral 304 denotes an image control section that makes settings as to reading of image data according to the copy mode settings analyzed by the job control section 302. For example, if the magnification/reduction ratio for copying is designated via the operating section, the image control section 304 calculates the image size according to the magnification/reduction ratio and the determined size of an original notified from the reader control section 202.

Reference numeral 305 denotes an image memory control section that secures an image data area in the image memory 307 according to the image size calculated by the image control section 304 and sets a start address of image data and the like.

A reader image I/F 306 as a receiving section that receives reader clock synchronous image data inputted from the reader control section 202 to the image controller section 203 via the reader clock synchronous image data bus 209 is connected to the image memory 307 via a reader image clock synchronous image data bus 309 of the image controller section 203, so that an image read by the reader 102 can be written into the image memory 307.

Further, in order that the printer control section 204 reads out image data from the image memory 307, the image controller section 203 transfers an image to the printer clock synchronous image data bus 210 through the printer image I/F 308 via a printer clock synchronous image data bus 310 according to a printer clock supplied from the printer control section 204. Then, the laser section 119 of the printer 100 exposes the image data onto the photosensitive drum 111.

As described above, by transferring image data received from the reader control section 202 to the printer control section 204 via the image memory 307, the image controller section 203 converts the transfer speed of the image data from the speed synchronous with the reader clock into the speed synchronous with the printer clock inside the image controller section 203.

A description will now be given of how reading and writing image data from and into the image memory 307 is carried out.

FIG. 4A is a reader processing speed table used in the first embodiment, and shows the relationship between IDs of a plurality of types of readers having an image sensor such as a CCD with different image transfer clocks and processing speeds of the readers.

In FIG. 4A, the processing speed is 100 mm/sec if the reader ID is "1", the processing speed is 150 mm/sec if the reader ID is "2", the processing speed is 250 mm/sec if the reader ID is "3", and the processing speed is 300 mm/sec if the reader ID is "4".

FIG. 4B is a view of a printer processing speed table used in the first embodiment and showing the relationship between IDs of a plurality of types of readers having an exposure device such as a laser with different image transfer clocks and processing speeds of the printers.

In FIG. 4B, the processing speed is 300 mm/sec if the printer ID is "1", the processing speed is 350 mm/sec if the printer ID is "2", the processing speed is 400 mm/sec if the printer ID is "3", and the processing speed is 450 mm/sec if the printer ID is "4".

FIG. 4C shows equations for use in calculating the timing for reading out printer clock synchronous image data by the image controller section 203 in the case where a reader having the reader ID "2" in the reader processing speed table and a printer having the printer ID "1" in the printer processing speed table are used in combination.

If the job control section 302 having received the reader ID and the printer ID notifies the image control section 304 of these IDs, the image control section 304 performs calculation according to the equations of FIG. 4C. The image control section 304 notifies the image memory control section 305 of printer clock readout timing as the result of the calculation to set the timing for reading out image data from the image memory 307.

Where the sub-scan size of the image size calculated by the image control section 304 is designated by ImgV, the reader processing speed is designated by R, and the printer processing speed is designated by P, the timing T for reading out the printer clock synchronous image data is calculated according to the following equation:

$$T = \mathrm{Img}V \times (P-R)/P$$

If the reader processing speed R is 150 mm/sec as in the example of FIG. 4A and the printer processing speed P is 300 mm/sec as in the example of FIG. 4B, the printer clock synchronous image data readout timing T is represented by the following expression:

$$\begin{aligned} T &= ImgV \times (300 - 150)/300 \\ &= ImgV \times 0.5 \end{aligned}$$

As is clear from this expression, half of the image size corresponds to the printer clock synchronous image data readout timing.

Figure 5A:
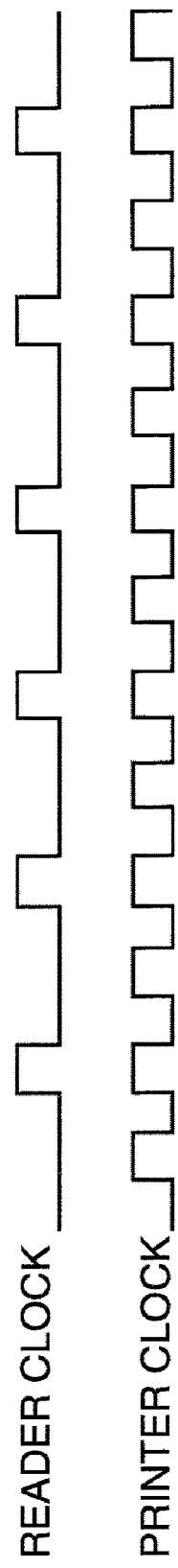
FIG. 5A is a timing chart showing clocks.

FIG. 5A is a timing chart showing the timing relationship between a reader clock as an image transfer clock of the image sensor section 108 and a printer clock as an image transfer clock of the exposure device such as the laser section 119 in the case where the reader processing speed R is 150 mm/sec as in the example of FIG. 4A and the printer processing speed P is 300 mm/sec as in the example of FIG. 4B.

Since the reader processing speed R is 150 mm/sec and the printer processing speed P is 300 mm/sec, one cycle of the reader clock is twice as long as that of the printer clock.

Figure 5B:
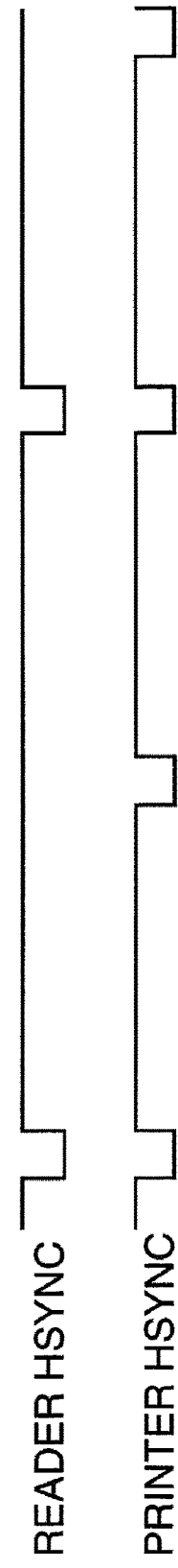
FIG. 5B is a timing chart showing horizontal synchronization signals.

FIG. 5B is a timing chart showing the timing relationship between a reader HSYNC as a horizontal synchronization signal representing the sub-scanning side image writing timing of the reader and a printer HSYNC as a horizontal synchronization signal representing the sub-scanning side image writing timing of the printer. These signals are generated by a circuit, not shown, based on the reader clock and the printer clock, and one cycle of the reader HSYNC is twice as long as that of the printer HSYNC as is the case with the relationship between the reader clock and the printer clock.

Figure 6:
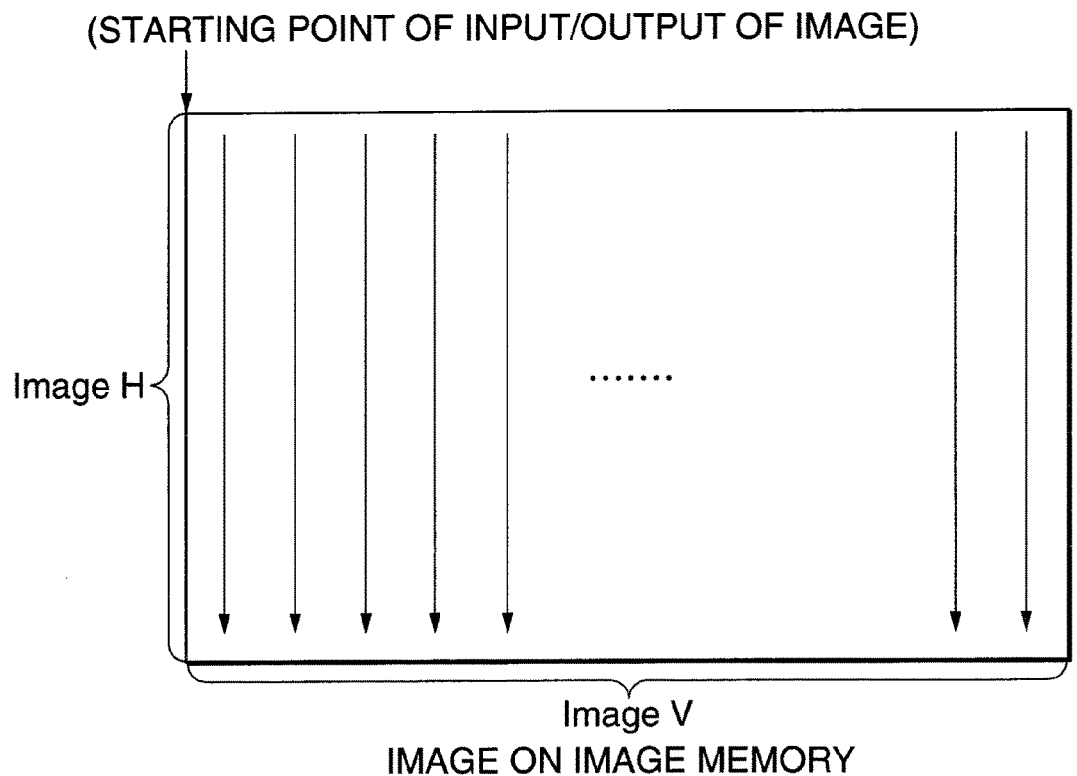
FIG. 6 is a conceptual diagram showing an image forming method.

FIG. 6 is a conceptual diagram showing how an image is actually written onto the image memory 307. The main scan size and sub-scan size of an image in a copy job calculated by the image control section 304 are designated by ImageH and ImageV, respectively, and an image area specified by ImageH and ImageV is secured on the image memory 307. The starting point of the secured image area is taken as an address on the image memory 307, and corresponds to an image input/output starting point in FIG. 6.

The reader clock synchronous image data transferred through the reader image I/F 306 is written in the secured image area in the main scanning direction on a line-by-line basis in synchronism with the reader HSYNC, i.e. in directions indicated by arrows.

The starting points of the arrows correspond to the leading ends of the image data in the main scanning direction depending on an image effective interval signal, not shown, set by the memory control section 305 based on the size corresponding to ImageH from the starting point of the reader HSYNC, and the ending points of the arrows correspond to the trailing ends of the image data in the main scanning direction depending on the image effective interval signal.

The sub-scan size ImageV of the image in the copy job calculated by the image control section 304 is determined by an effective interval signal, not shown, set by the image memory control section 305, and the reader clock synchronous image data is written a number of times synchronous with the reader HSYNC.

In this way, the reader clock synchronous image data is written onto the image memory 307. Likewise, the printer clock synchronous image data is read from the image area specified by ImageH and ImageV on the image memory 307 starting with the image input/output starting point thereof and transferred to the printer image I/F 308 in synchronism with the printer clock and the printer HSYNC.

Figure 7:
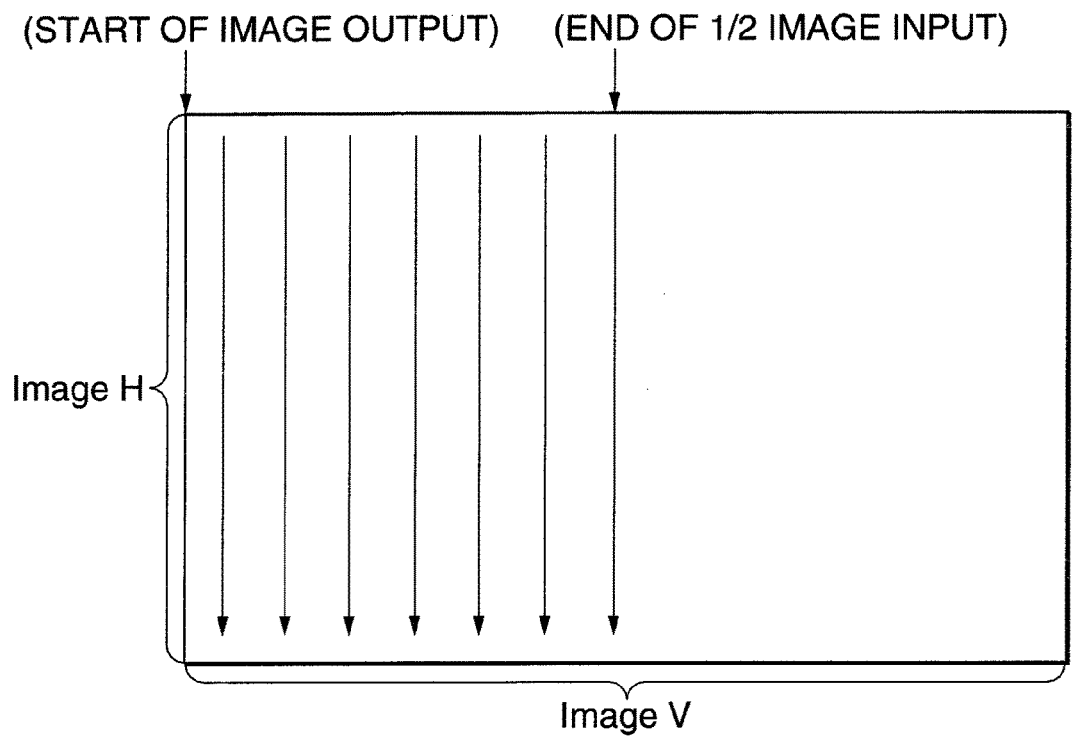
FIG. 7 is a conceptual diagram showing timing for writing (inputting) and reading out (outputting) an image into and from an image memory.

FIG. 7 is a conceptual diagram showing the timing for writing (inputting) and reading out (outputting) an image into and from the image memory 307 in the case where the respective processing speeds are set as in the examples of FIGS. 4A and FIG. 4B.

Since the printer image readout timing corresponds to half of the sub scan image size ImageV as is clear from the result of calculation according to the equation in FIG. 4C, the readout of the printer clock synchronous image data is started ("start of image output" in FIG. 7) in timing in which the writing of the reader clock synchronous reader image is half completed ("end of ½ image input" in FIG. 7).

Figure 8:
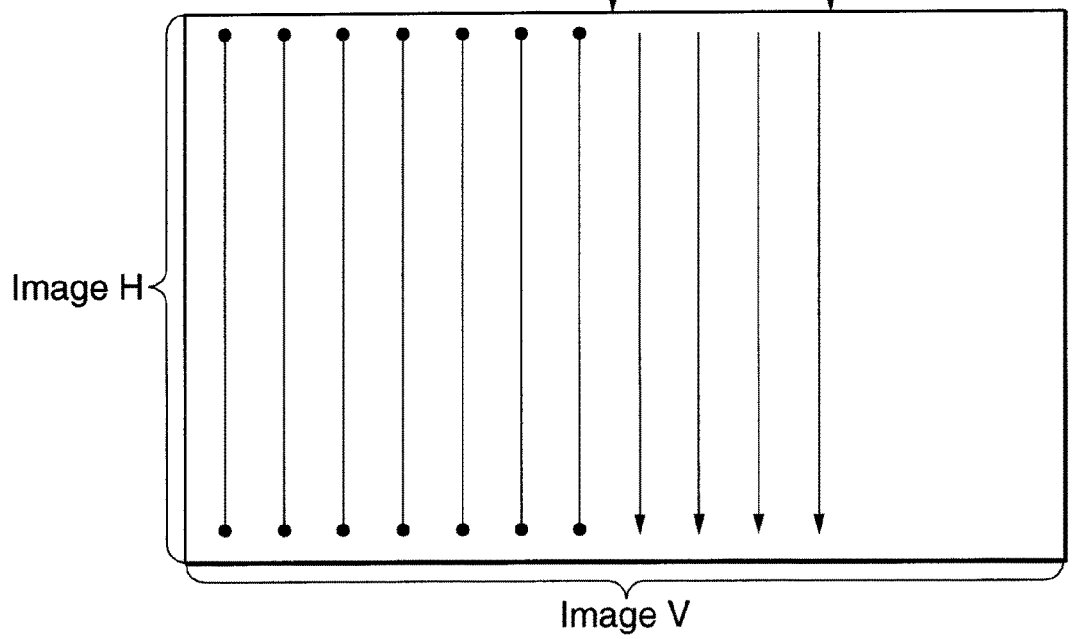
FIG. 8 is a conceptual diagram showing a state in which the image data is written into and read out from the image memory at the same time.

FIG. 8 is a conceptual diagram showing a state in which the reader clock synchronous image data is written into the image memory 307 and the printer clock synchronous image data is read out from the image memory 307 at the same time.

In FIG. 8, lines with both ends thereof indicated by black circles are main scan lines for which the readout of the image data has been completed, and lines with trailing ends thereof indicated by arrows are main scan lines for which the writing of the image data has been completed but the readout of the image data has not been completed. In the state shown in FIG. 8, ¾ of the image data has been inputted and ½ of the image data has been read out.

Figure 9:
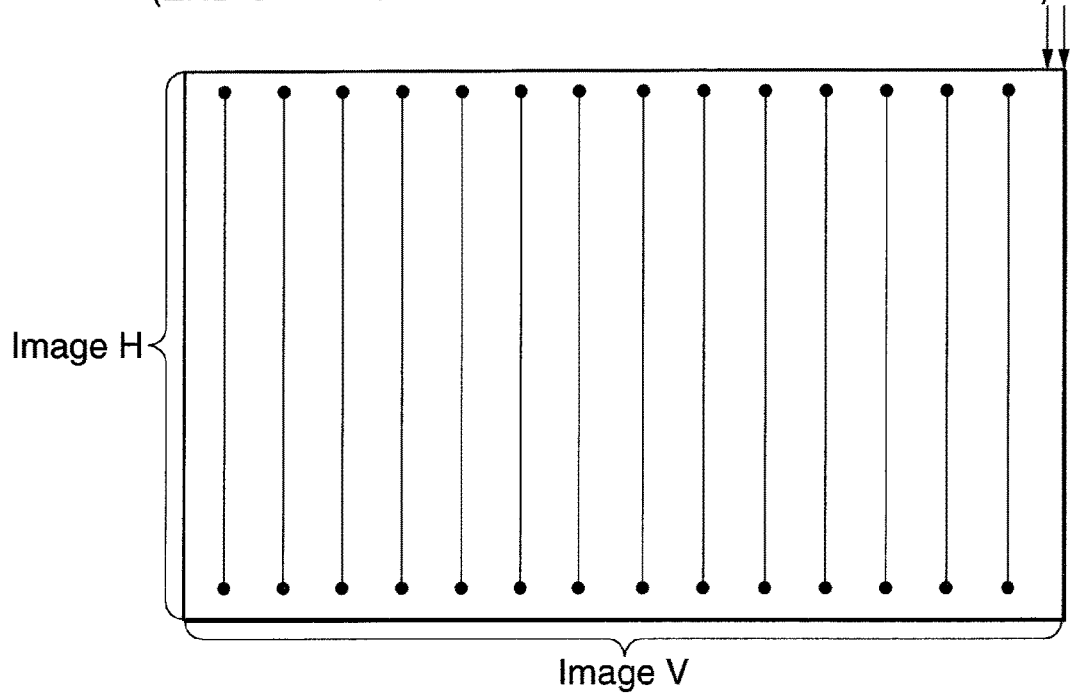
FIG. 9 is a conceptual diagram showing a state immediately after writing and reading of the image data have been completed.

FIG. 9 is a conceptual diagram showing a state immediately after the writing and reading of the image data have been completed. In the example of FIG. 9, all of the image data in the image area specified by ImageH and ImageV has been written into the image memory 307, and all of the image data has been outputted.

As described above, the image data can be efficiently written into and read out from the image memory 307 based on the reader and printer processing speeds in the examples of FIG. 4A and FIG. 4B and the image readout timing calculated according to the equation of FIG. 4C.

Referring to a flow chart of FIG. 10, a description will now be given of the procedure for acquiring IDs which are used in acquiring the reader processing speed corresponding to the reader ID and the printer processing speed corresponding to the printer ID as exemplified in FIGS. 4A and 4B.

Power is applied to the image forming apparatus in FIG. 1 in a step S101, and the image controller section 203 starts initializations in a step S102. In the step S102, the image controller section 203 makes settings of registers of circuits, not shown, that control the image memory 307, and carries out initialization of communication with the reader control section 202 and the printer control section 204, and others.

After completion of the initializations, the image controller section 203 determines in a step S103 whether or not the printer control section 204 is connected to the image controller section 203 through the printer control communication I/F 303. If it is determined that the printer control section 204 is not connected to the image controller 203, the image controller section 203 waits until the printer control section 204 is connected thereto. Upon detection of the connection, the image controller section 203 acquires a printer ID from the printer control section 204, and causes the job control section 302 to store the ID in a step S104.

After acquiring the printer ID, the image controller section 203 determines in a step S105 whether the reader control section 202 is connected to the image controller 203 through the reader control communication I/F 301. If it is determined that the reader control section 202 is not connected to the image controller 203, the image controller section 203 waits until the reader control section 202 is connected thereto. Upon detection of the connection, the image controller section 203 acquires a reader ID from the reader control section 202, and causes the job control section 302 to store the ID in a step S106, and terminates the initialization in a step S107. In this way, the reader ID and the printer ID are acquired.

Figure 10:
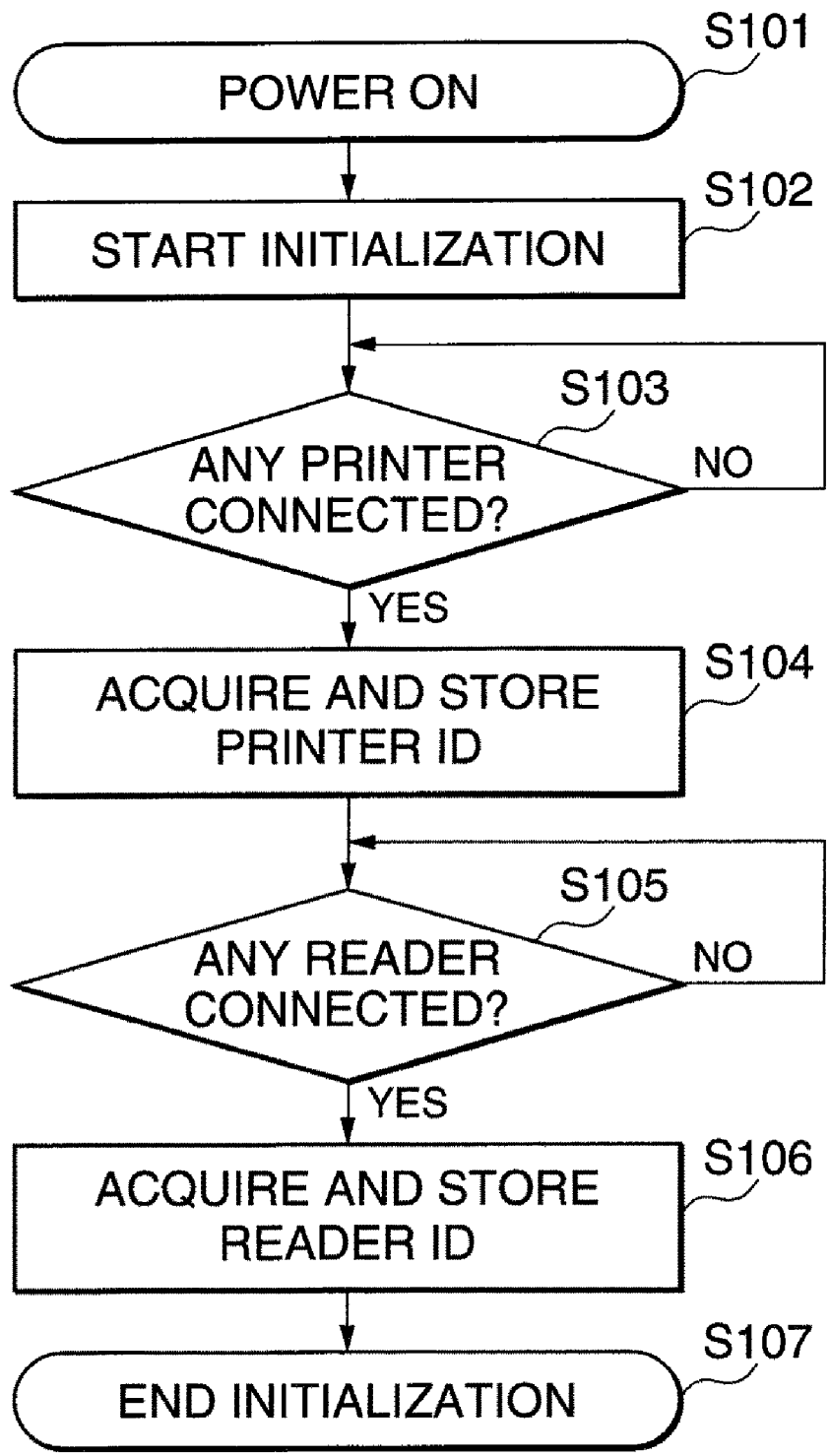
FIG. 10 is a flow chart showing an ID acquiring process in initialization.
Figure 11:
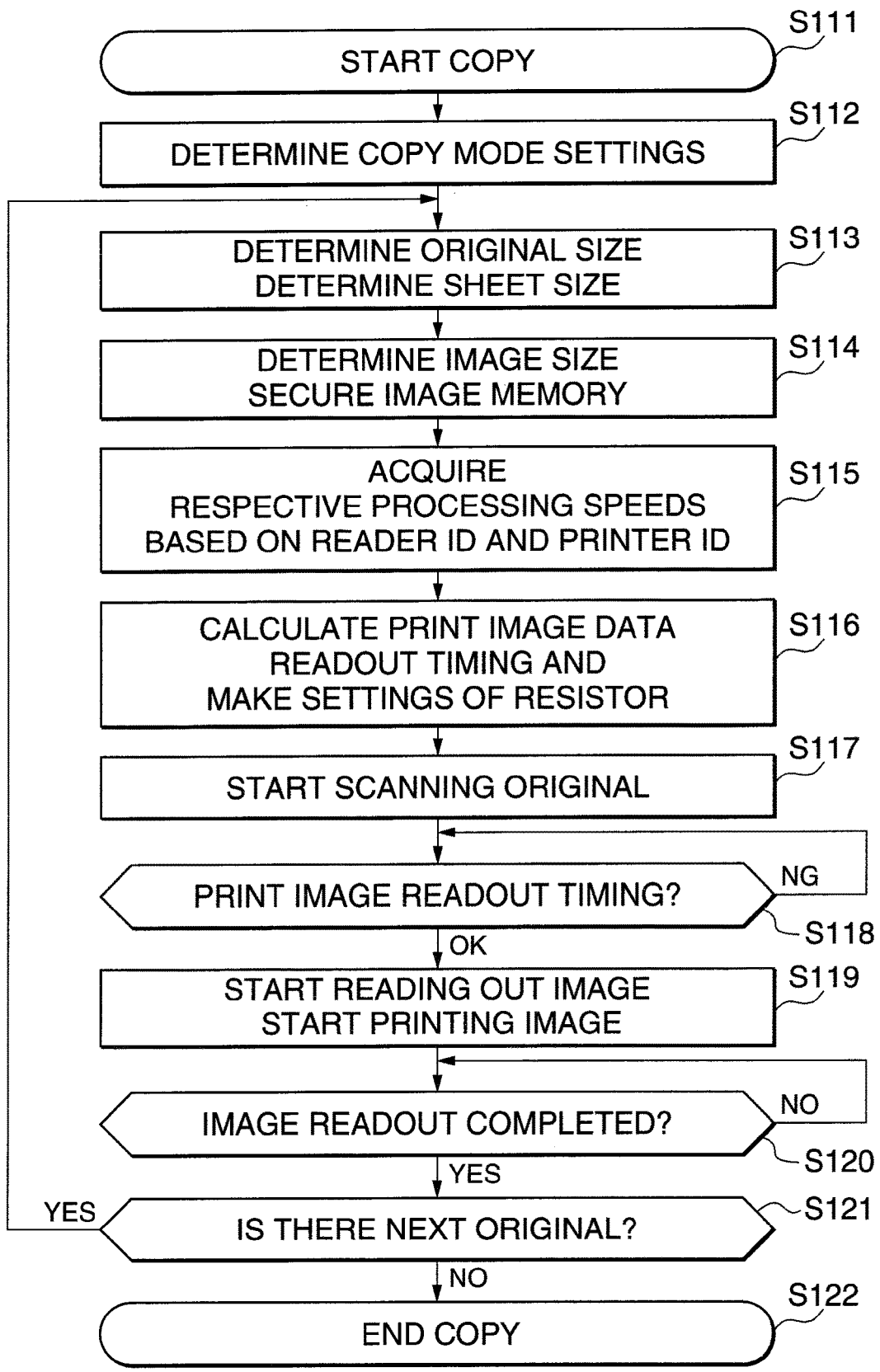
FIG. 11 is a flow chart showing the procedure for controlling the image memory during copying.

FIG. 11 is a flow chart showing the procedure for controlling the image memory during copying, and shows a process for determining the image readout timing in the actual copy job and actually forming an original image on a sheet, with reference to the reader ID and the printer ID acquired according to the procedure of FIG. 10.

First, in a step S111, the job control section 301 starts a copy job in response to an instruction for starting copy inputted through the operating section, not shown.

In the next step S112, the job control section 302 determines copy mode settings based on settings made through the operating section, not shown, such as the magnification. Further, in a step S113, the job control section 302 determines the size of an original, which is detected by the reader control section 202 and acquired via the reader control communication I/F 301, as the original size. The job control section 302 selects a sheet from those stacked on the feeding cassettes 121, 122, 123, 124, 150, and 154 according to the determined copy mode settings and the determined original size, and then determines the sheet to be fed.

In the next step S114, the job control section 302 notifies the image control section 304 of the original size, the sheet size, and the like determined in the step S113, and the image control section 304 determines the image size. The image control section 304 then notifies the image memory control section 305 of the image size, and the image memory control section 305 secures an image area for the image data on the image memory 307.

In a step S115, the reader and printer processing speeds are acquired with reference to the respective processing speed tables of FIG. 4A and FIG. 4B based on the reader ID and the printer ID notified from the job control section 302.

In a step S116, by calculation according to the equation of FIG. 4C, the image control section 304 determines the print image data readout timing, and notifies the image memory control section 305 of the timing and sets the actual print image data readout timing in the image memory 307.

In a step S117, scanning of the original is started to start inputting image data to the image memory 307. In a step S118, the image memory control section 305 waits until the print image data readout timing. Upon the print image data readout timing being reached, the image memory control section 305 sets an image readout starting position in the image memory 307 to start printing the print image data to be read out and printed in a step S119.

In a step S120, the image memory control section 305 waits until readout of the image is completed. In this case, the completion of the readout of the image means that the input of the image is completed at the same time according to the equation of FIG. 4C.

In a step S121, the job control section 302 determines whether or not there is the next original on the original feeder 180 or whether or not the original is to be read again by the reader 102. If it is determined in the step S121 that there is the next original or the original is to be read again, the process returns to the step S113 to determine the original size again and perform the subsequent processing to prepare for copying.

If it is determined in the step S121 that there is no next original or the original is not to be read again, the process proceeds to a step S122 to end copying.

The above described process makes it possible to input an image of an original to the image memory 307 and output the image to be printed on a sheet from the image memory 307 in an efficient manner.

Second Embodiment

Although in the first embodiment described above, the respective processing speeds are acquired based on the reader ID and the printer ID, the respective processing speeds are acquired based on the number of copies read by a reader and the number of copies printed by a printer according to a second embodiment of the present invention.

FIG. 12A shows a reader processing speed table used in the second embodiment, and shows the relationship between the number of copies read by a plurality of types of readers, which read different numbers of copies per unit time (one minute), and the reader processing speeds of the readers.

In FIG. 12A, the reader processing speed is 100 mm/sec if the number of copies read by a reader is "20", the reader processing speed is 150 mm/sec if the number of copies read by a reader is "30", the reader processing speed is 250 mm/sec if the number of copies read by a reader is "40", and the reader processing speed is 300 mm/sec if the number of copies read by a reader is "60".

FIG. 12B is a view of a printer processing speed table used in the second embodiment and showing the relationship between the number of copies printed by a plurality of types of printers, which output different numbers of copies per unit time (one minute), and the printer processing speeds of the printers.

In FIG. 12B, the printer processing speed is 300 mm/sec if the number of copies printed by a printer is "30", the printer processing speed is 350 mm/sec if the number of copies printed by a printer is "40", the printer processing speed is 400 mm/sec if the number of copies printed by a printer is "60", and the printer processing speed is 450 mm/sec if the number of copies printed by a printer is "80".

FIG. 12C shows equations for use in calculating the timing for reading out printer clock synchronous image data by the image controller section 203 in the case where the number of copies read by a reader is "30" in the reader processing speed table and the number of copies printed by a printer is "30" in the printer processing speed table.

Calculations according to the equations of FIG. 12C are executed by the image control section 304 when the job control section 302 having received the number of copies read by the reader and the number of copies printed by the printer notifies the image control section 304 of the respective numbers of copies. The image control section 304 notifies the image memory control section 305 of printer clock readout timing as the result of the calculations to set the timing for reading out image data from the image memory 307.

Where the sub-scan size of the image size calculated by the image control section 304 is designated by ImgV, the reader processing speed is designated by R, and the printer processing speed is designated by P, the timing T for reading out the printer clock synchronous image data is calculated according to the following equation:

$$T = ImgV \times (P-R)/P$$

If the reader processing speed R is 150 mm/sec as in the example of FIG. 12A and the printer processing speed P is 300 mm/sec as in the example of FIG. 12B, the printer clock synchronous image data readout timing T is represented by the following expression:

$$T = ImgV \times (300 - 150)/300$$
$$= ImgV \times 0.5$$

As is clear from this expression, half of the image size corresponds to the printer clock synchronous image data readout timing.

Referring to a flow chart of FIG. 13, a description will now be given of the procedure for acquiring information on the number of copies, which is used in acquiring the reader processing speed corresponding to the number of copies read by a reader per unit time and the printer processing speed corresponding to the number of copies printed by a printer as shown in FIG. 12A and FIG. 12B.

First, after carrying out initialization as in the same manner as in the initialization in the steps S101 to S103 according to the first embodiment described with reference to FIG. 10, in a step S201, the number of copies printed by a printer per unit time (one minute) is acquired from the printer control section 204, and the job control section 302 stores information on the number of copies printed by the printer.

Further, after the same process as in the step S105 described with reference to FIG. 10 is carried out, in a step S202, the number of copies read by a reader per unit time (one minute) is acquired from the reader control section 202, and the job control section 302 stores information on the number of copies read by the reader. The initialization is then terminated in the step S107 described with reference to FIG. 10.

In this way, the numbers of copies read by a reader and outputted by a printer per unit time (one minute) are acquired.

Figure 13:
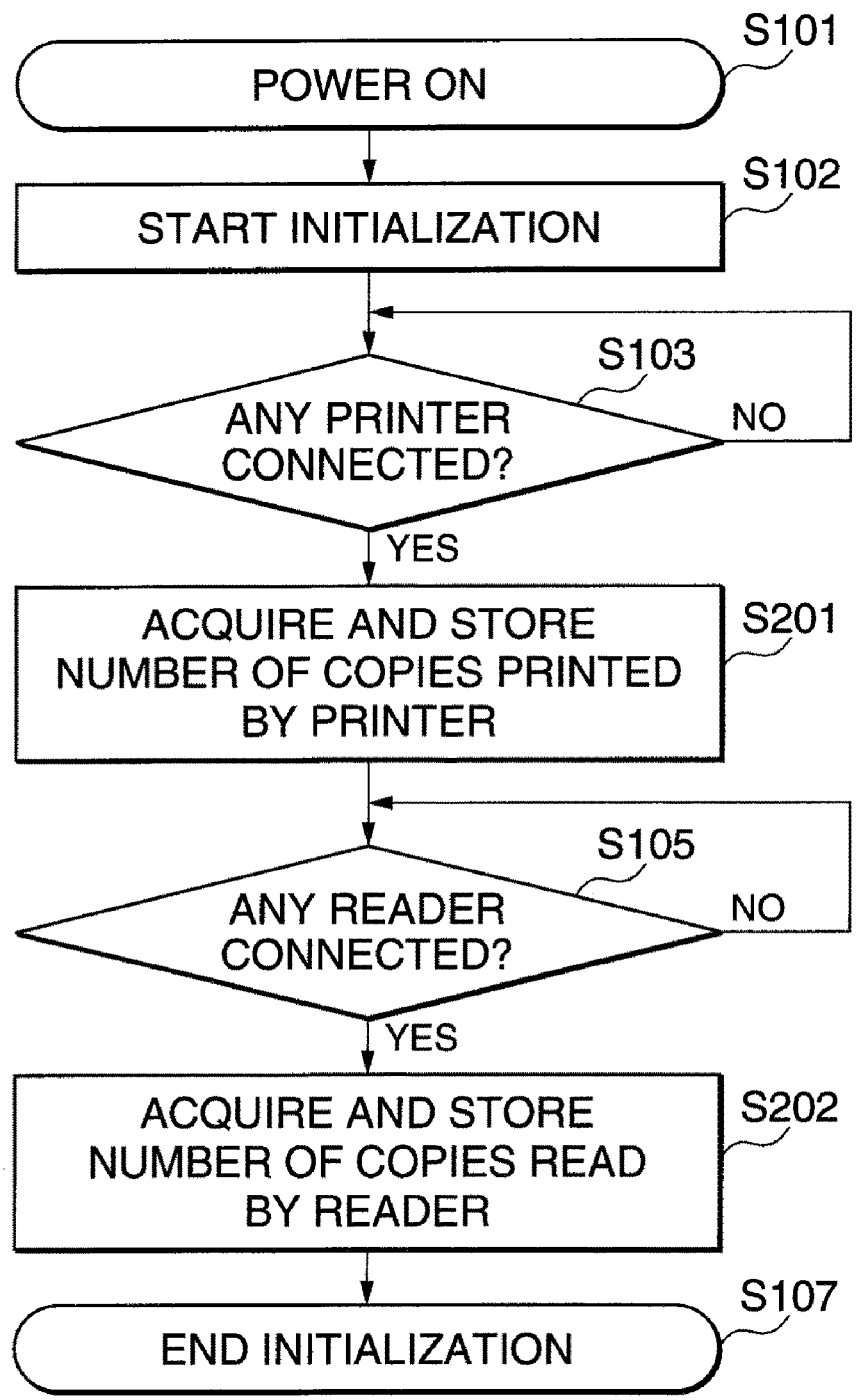
FIG. 13 is a flow chart showing a number information acquiring process according to the second embodiment.
Figure 14:
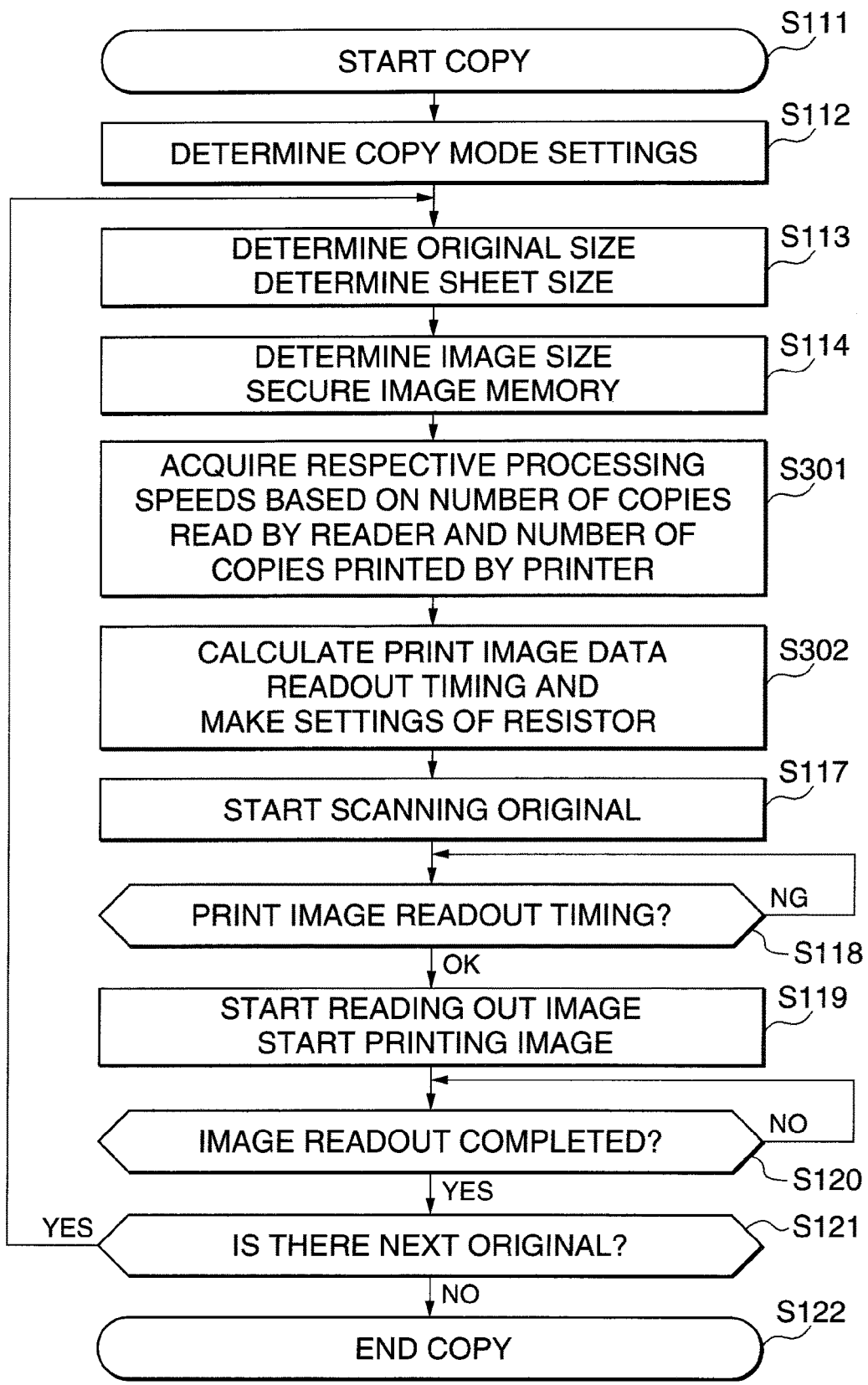
FIG. 14 is a flow chart showing the procedure for controlling an image memory during copying according to the second embodiment.

FIG. 14 is a flow chart showing the procedure for controlling the image memory during copying according to the second embodiment, and shows a process for determining the image readout timing in the actual copy job and actually forming an original image on a sheet with reference to information on the number of copies read by a reader and the number of copies printed by a printer acquired according to the procedure of FIG. 13.

First, after carrying out the same process as in the process of the steps S111 to S114 according to the first embodiment described with reference to FIG. 11, the respective processing speeds are acquired in a step S301 by referring to the respective processing speed tables of FIG. 12A and FIG. 12B based on the information on the number of copies read by a reader and the number of copies read by a printer notified from the job control section 302.

In the next step S302, by calculation according to the equation of FIG. 12C, the image control section 304 determines print image data readout timing, and notifies the image memory control section 305 of the timing and sets the actual print image data readout timing in the image memory 307.

Subsequently, the same process as the process of the steps S117 to S122 described with reference to FIG. 11 is carried out, and the process is terminated.

The above described process makes it possible to input an image of an original to the image memory 307 and output the image to be printed on a sheet from the image memory 307 in an efficient manner.

Third Embodiment

Although in the first and second embodiments described above, the printer processing speed and the reader processing speed are acquired using the tables, the printer processing speed and the reader processing speed are acquired directly from a printer and a reader according to a third embodiment of the present invention.

Specifically, the reader control section 202 and the image controller section 203 carry out communication with each other to exchange control data via the cable 206, so that the reader control section 202 notifies the image control section 203 of the reader processing speed as the image data transfer speed of the image sensor section 108.

Further, the image controller section 203 and the printer section 204 carry out communication with each other to exchange control data via the cable 206, so that the printer control section 204 notifies the image controller section 203 of the printer processing speed as the image data transfer speed of the laser section 119 at which image data stored in the image controller section 203 is transferred.

Therefore, as is the case with the first and second embodiments, the third embodiment enables efficient input of an image read from an original to the image memory 307 and efficient output of the image to be printed on a sheet from the image memory 307.

Fourth Embodiment

Although in the first embodiment, the respective processing speeds for use in determining the timing for reading out data from the image memory 307 are acquired based on the reader ID and the printer ID, a timing generation ratio for determining the timing for reading out data from the image memory 307 is acquired based on the reader ID and the printer ID according to a fourth embodiment of the present invention.

FIG. 15A is a view of a timing table used in the fourth embodiment and showing the relationship between IDs of a plurality of types of readers and printers and the timing generation ratio.

According to the table of FIG. 15A, the timing generation ratio is 0.66 if the reader ID is "1" and the printer ID is "1", the timing generation ratio is 0.5 if the reader ID is "2" and the printer ID is "1", the timing generation ratio is 0.17 if the reader ID is "3" and the printer ID is "1", and the timing generation ratio is 0 if the reader ID is "4" and the printer ID is "1".

Further, the timing generation ratio is 0.71 if the reader ID is "1" and the printer ID is "2", the timing generation ratio is 0.57 if the reader ID is "2" and the printer ID is "2", the timing generation ratio is 0.28 if the reader ID is "3" and the printer ID is "2", and the timing generation ratio is 0.14 if the reader ID is "4" and the printer ID is "2".

Further, the timing generation ratio is 0.75 if the reader ID is "1" and the printer ID is "3", the timing generation ratio is 0.63 if the reader ID is "2" and the printer ID is "3", the timing generation ratio is 0.25 if the reader ID is "3" and the printer ID is "3", and the timing generation ratio is 0.25 if the reader ID is "4" and the printer ID is "3".

Further, the timing generation ratio is 0.78 if the reader ID is "1" and the printer ID is "4", the timing generation ratio is 0.67 if the reader ID is "2" and the printer ID is "4", the timing generation ratio is 0.44 if the reader ID is "3" and the printer ID is "4", and the timing generation ratio is 0.33 if the reader ID is "4" and the printer ID is "4".

FIG. 15B shows equations for use in calculating the timing for reading out printer clock synchronous image data by the image controller section 203 in the case where a reader with the reader ID "2" and a printer with the printer ID "1" in the table are used in combination, and in the case where the a reader with the reader ID "4" and a printer with the printer ID "1" in the table are used in combination.

Calculations according to the above equations are executed by the image control section 304 when the job control section 302 having received the reader ID and the printer ID notifies the image control section 304 of the respective IDs. The image control section 304 notifies the image memory control section 305 of printer clock readout timing as the result of the calculation to set the timing for reading out image data from the image memory 307.

Where the sub-scan size of the image size calculated by the image control section 304 is designated by ImgV and the timing generation ratio is designated by TGR, the timing T for reading out the printer clock synchronous image data is calculated according to the following equation:

$$T = ImgV \times TGR$$

If a reader with the reader ID "2" and a printer with the printer ID "1" are used in combination and the timing generation ratio TGR is 0.5, the printer clock synchronous image data readout timing T is represented by the following expression:

$$T = ImgV \times 0.5$$

As is clear from this expression, half of the image size corresponds to the printer clock synchronous image data readout timing.

If a reader with the reader ID "4" and a printer with the printer ID "1" are used in combination and the timing generation ratio TGR is 0, the printer clock synchronous image data readout timing T is represented by the following expression:

$$T = ImgV \times 0 = 0$$

As is clear from this expression, the input of an image from the reader and the readout of image data to the printer are started at the same time.

Figure 16:
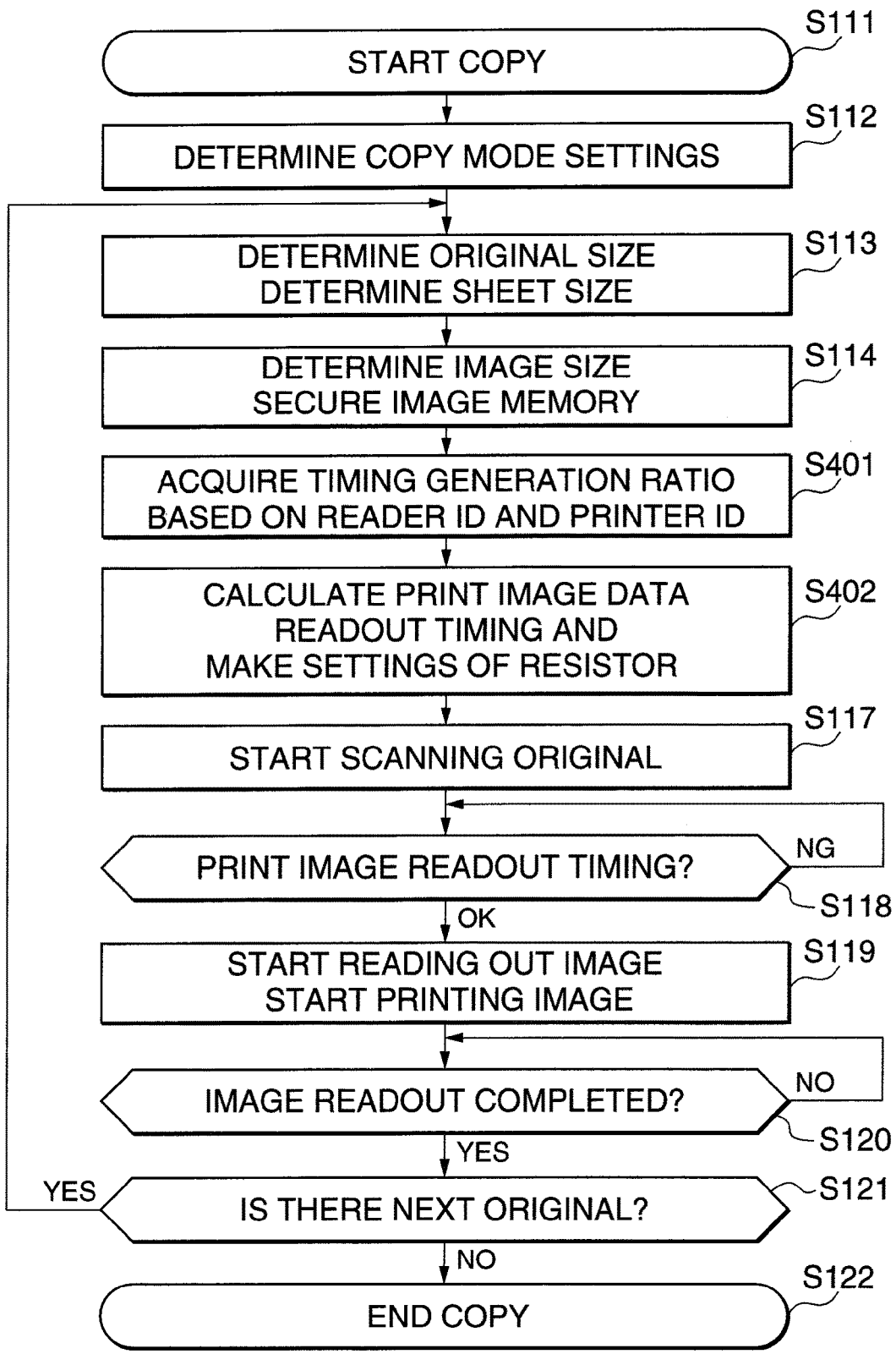
FIG. 16 is a flow chart showing the procedure for controlling an image memory during copying according to the fourth embodiment.

FIG. 16 is a flow chart showing the procedure for controlling the image memory during copying according to the fourth embodiment, and shows a process for determining the image readout timing in the actual copy job and actually forming an original image on a sheet with reference to the reader ID and the printer ID acquired according to the procedure of FIG. 10.

First, after carrying out the same process as in the process of the steps S111 to S114 according to the first embodiment described with reference to FIG. 11, the respective processing speeds are acquired in a step S401 by referring to the timing table of FIG. 15A based on the reader ID and the printer ID notified from the job control section 302.

In the next step S402, by calculation according to the equation of FIG. 15B, the image control section 304 determines print image data readout timing, and notifies the image memory control section 305 of the timing and sets the actual print image data readout timing in the image memory 307.

Subsequently, the same process as the process of the steps S117 to S122 described with reference to FIG. 11 is carried out, and the process is terminated.

The above described process makes it possible to efficiently input an image of an original to the image memory 307 and efficiently output the image to be printed on a sheet from the image memory 307.

Fifth Embodiment

Although in the above described fourth embodiment, the timing generation ratio is acquired based on the reader ID and the printer ID, the timing generation ratio is determined based on the number of copies read by a reader and the number of copies printed by a printer according to a fifth embodiment of the present invention.

FIG. 17A is a view of a timing table according to the fifth embodiment and showing the relationship between the number of copies read by a plurality of types of readers per unit time (one minute) and the number of copies printed by a plurality of types of printers per unit time (one minute) and the timing generation ratio.

According to the timing table of FIG. 17A, the timing generation ratio is 0.66 if the number of copies read by a reader is "20" and the number of copies printed by a printer is "30", the timing generation ratio is 0.5 if the number of copies read by a reader is "30" and the number of copies printed by a printer is "30", the timing generation ratio is 0.17 if the number of copies read by a reader is "40" and the number of copies printed by a printer is "30", and the timing generation ratio is 0 if the number of copies read by a reader is "60" and the number of copies printed by a printer is "30".

Further, the timing generation ratio is 0.71 if the number of copies read by a reader is "20" and the number of copies printed by a printer is "40", the timing generation ratio is 0.57 if the number of copies read by a reader is "30" and the number of copies printed by a printer is "40", the timing generation ratio is 0.28 if the number of copies read by a reader is "40" and the number of copies printed by a printer is "40", and the timing generation ratio is 0.14 if the number of copies read by a reader is "60" and the number of copies printed by a printer is "40".

Further, the timing generation ratio is 0.75 if the number of copies read by a reader is "20" and the number of copies printed by a printer is "60", the timing generation ratio is 0.63 if the number of copies read by a reader is "30" and the number of copies printed by a printer is "60", the timing generation ratio is 0.25 if the number of copies read by a reader is "40" and the number of copies printed by a printer is "60", and the timing generation ratio is 0.25 if the number of copies read by a reader is "60" and the number of copies printed by a printer is "60".

Further, the timing generation ratio is 0.78 if the number of copies read by a reader is "20" and the number of copies printed by a printer is "80", the timing generation ratio is 0.67 if the number of copies read by a reader is "30" and the number of copies printed by a printer is "80", the timing generation ratio is 0.44 if the number of copies read by a reader is "40" and the number of copies printed by a printer is "80", and the timing generation ratio is 0.33 if the number of copies read by a reader is "60" and the number of copies printed by a printer is "80".

FIG. 17B shows equations for use in calculating the timing for reading out printer clock synchronous image data by the image controller section 203 in the case where a reader which reads "30" copies per unit time and a printer which prints "30" copies per unit time in the table are used in combination, and in the case where the a reader which reads "60" copies per unit time and a printer which prints "30" copies per unit time in the table are used in combination.

Calculations according to the above equations are executed by the image control section 304 when the job control section 302 having received the reader ID and the printer ID notifies the image control section 304 of the respective IDs. The image control section 304 notifies the image memory control section 305 of printer clock readout timing as the result of the calculation to thus set readout timing for reading out image data from the image memory 307.

Where the sub-scan size of the image size calculated by the image control section 304 is designated by ImgV and the timing generation ratio is designated by TGR, the timing T for reading out the printer clock synchronous image data is calculated according to the following equation:

$$T = ImgV \times TGR$$

If a reader which reads "30" copies per unit time and a printer which prints "30" copies per unit time are used in combination and the timing generation ratio TGR is 0.5, the printer clock synchronous image data readout timing T is represented by the following expression:

$$T = ImgV \times 0.5$$

As is clear from this expression, half of the image size corresponds to the printer clock synchronous image data readout timing.

If a reader which reads "60" copies per unit time and a printer which prints "30" copies per unit time are used in combination and the timing generation ratio TGR is 0, the printer clock synchronous image data readout timing T is represented by the following expression:

$$T = ImgV \times 0 = 0$$

As is clear from this expression, the input of an image from the reader and the readout of image data to the printer are started at the same time.

Figure 18:
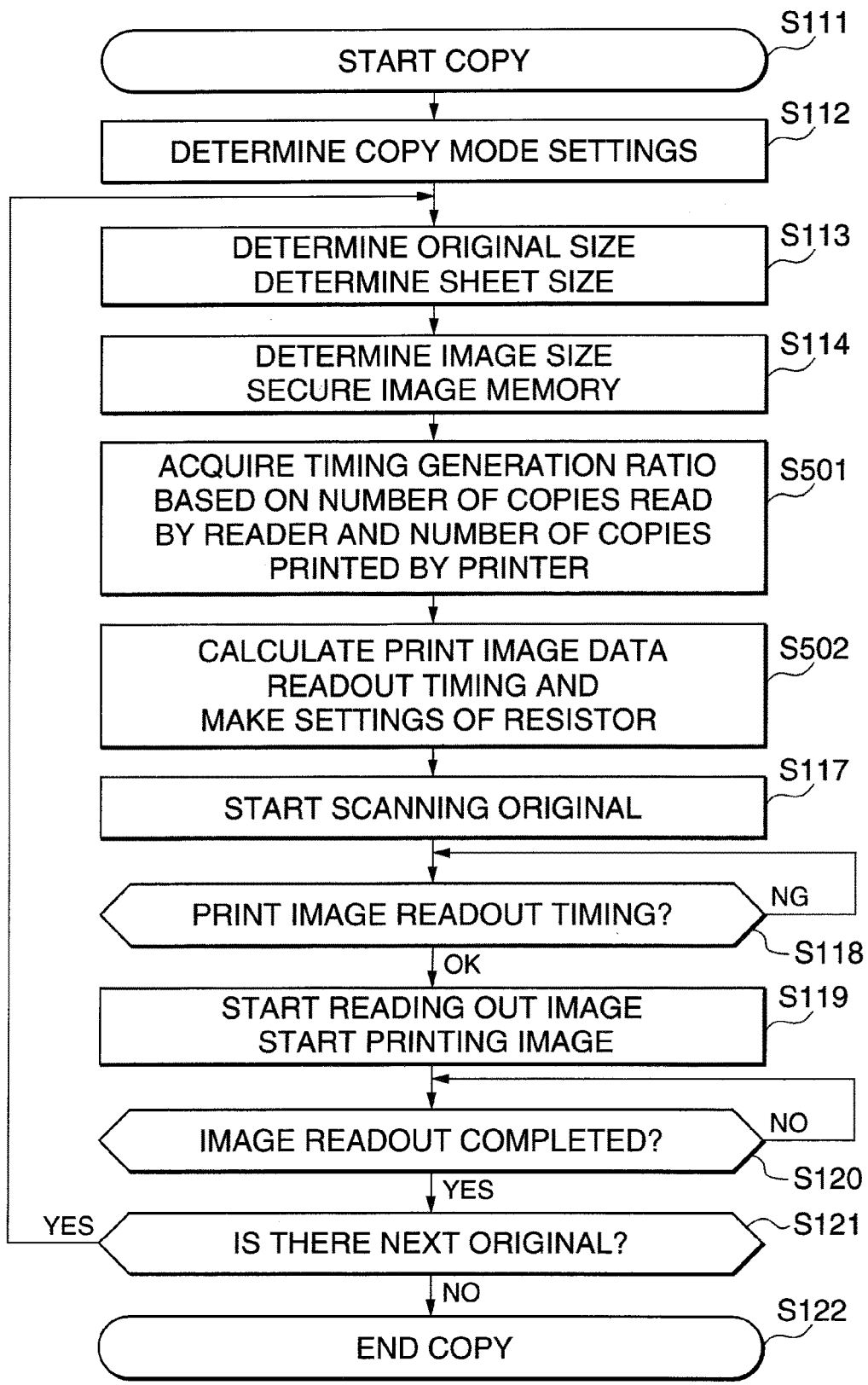
FIG. 18 is a flow chart showing the procedure for controlling an image memory during copying according to the fifth embodiment.

FIG. 18 is a flow chart showing the procedure for controlling the image memory during copying according to the fifth embodiment, and shows a process for determining the image readout timing in the actual copy job and actually forming an original image on a sheet with reference to the number of copies read by a reader and the number of copies printed by a printer acquired according to the procedure of FIG. 13.

First, after carrying out the same process as in the process of the steps S111 to S114 according to the first embodiment described with reference to FIG. 11, the respective processing speeds are acquired in a step S501 by referring to the timing table of FIG. 17A based on the number of copies read by a reader and the number of copies printed by a printer notified from the job control section 302.

In the next step S502, by calculation according to the equation of FIG. 17B, the image control section 304 determines print image data readout timing, and notifies the image memory control section 305 of the timing and sets the actual print image data readout timing in the image memory 307.

Subsequently, the same process as the process of the steps S117 to S122 described with reference to FIG. 11 is carried out, and the process is terminated.

The above described process makes it possible to efficiently input an image of an original to the image memory 307 and efficiently output the image to be printed on a sheet from the image memory 307.

Although in the above described embodiments, the reader 102 and the printer 100 are configured as an integral unit, the present invention may be applied to a separate-type image forming apparatus in which a reader and a printer are connected to each other via a cable.

Figure 19A:
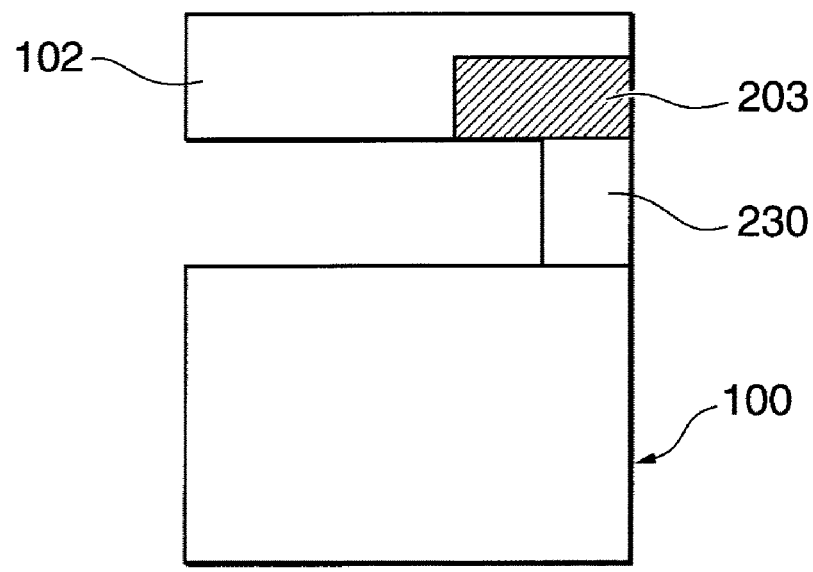
FIG. 19A is a schematic view showing the arrangement of an image forming apparatus including a reader according to a sixth embodiment of the present invention.

FIG. 19A is a schematic view showing the arrangement of an image forming apparatus including a reader according to a sixth embodiment of the present invention.

As shown in FIG. 19A, an image controller section 203 is arranged inside the reader 102.

It should be noted that the image controller section 203 and the reader 102 may be arranged in separate bodies from each other.

The reader 102 is connected to the printer 100 via a cable 230 for communication with each other.

The reader 102 has provided therein a memory, not shown, that stores image data read by the reader 102, and a receiver section that receives printer information related to the printer 100 from the printer 100. The controller 203 determines, while the read image data is being written to the memory, timing for reading out the image data written in the memory according to the printer information received by the receiver section and reader information related to the reader 102.

Figure 19B:
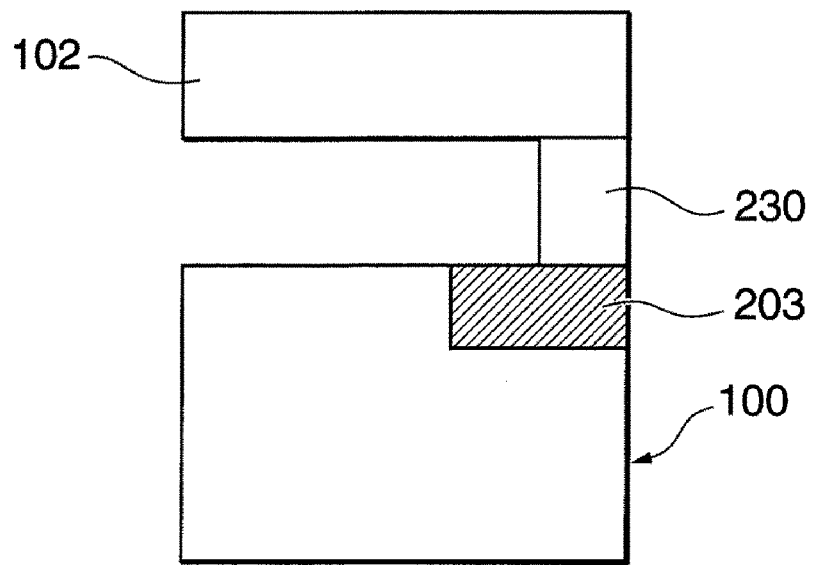
FIG. 19B is a schematic view showing the arrangement of an image forming apparatus including a printer according to a seventh embodiment of the present invention.

FIG. 19B is a schematic view showing the arrangement of an image forming apparatus including a printer according to a seventh embodiment of the present invention.

As shown in FIG. 19B, an image controller section 203 is arranged inside the printer 100.

It should be noted that the image controller section 203 and the printer 100 may be arranged in separate bodies from each other.

The printer 100 is connected to the reader 102 via a cable 230 for communication with each other.

The printer 100 has provided therein a memory, not shown, that receives image data from the reader 102 and stores the same, and a receiver section that receives reader information related to the reader 102 from the reader 102. The controller 203 determines, while the image data received from the reader 102 is being written to the memory, timing for reading out the image data written in the memory according to the reader information received by the receiver section and printer information related to the printer 100.

It should be noted that the above described control methods can be realized by storing programs conforming to the flow charts of FIGS. 10, 11, 13, 14, 16, and 18 in a storage of the image controller section 203 and executing the programs.

The present invention may be applied to a system composed of a plurality of apparatuses or to a single apparatus.

It is to be understood that the object of the present invention may also be accomplished by supplying a system or an apparatus with a storage medium in which a program code of software which realizes the functions of the above described embodiments is stored, and causing a computer (or CPU or MPU) of the system or apparatus to read out and execute the program code stored in the storage medium.

In this case, the program code itself read from the storage medium realizes the functions of the embodiments described above, and hence the storage medium on which the program code is stored constitutes the present invention.

Examples of the storage medium for supplying the program code include a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of the above described embodiments may be accomplished not only executing a program code read out by a computer, but also by causing an OS (Operating System) or the like which operates on the computer to perform a part or all of the actual operations based on instructions of the program code.

Further, it is to be understood that the functions of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A printer control apparatus that receives data of an image in an original from a reader, writes the data of the image in a memory, and transmits the written image data from the memory to a printer, the printer control apparatus comprising:
   a controller which controls transmission of the image data written in the memory to the printer while the image data received from the reader is being written to the memory, wherein said controller includes:
   a first determining portion which determines a size of the original;
   a second determining portion which determines a data size of the image data based on the determined size of the original;
   a third determining portion which determines a reader processing speed, at which the reader reads the image of the original; and
   a fourth determining portion which determines a printer processing speed, at which the printer prints an image, wherein said controller transmits, when a predetermined data amount of the image data from the reader, which is smaller than the data size determined by the second determining portion, has been written in the memory, the image data written in the memory to the printer, and
   wherein said controller determines the predetermined data amount according to the reader processing speed determined by the third determining portion, the printer processing speed determined by the fourth determining portion, and the image data size determined by the second determining portion.

2. A printer control apparatus according to claim 1, wherein:
   the third determining portion receives the reader processing speed from the reader, and
   the fourth determining portion receives the printer processing speed from the printer.

3. A printer control apparatus according to claim 1, wherein said controller secures an area for writing the received image data in the memory according to the image data size determined by the second determining portion.

4. A printer control apparatus according to claim 1, wherein the second determining portion also determines the image data size based on a magnification/reduction ratio for copying the original and the determined size of the original.

5. A printer control apparatus according to claim 1, wherein said controller determines timing for starting transmitting the image written in the memory to the printer.

* * * * *